(12) United States Patent
Pozgay

(10) Patent No.: US 8,427,371 B2
(45) Date of Patent: Apr. 23, 2013

(54) RF FEED NETWORK FOR MODULAR ACTIVE APERTURE ELECTRONICALLY STEERED ARRAYS

(75) Inventor: Jerome H. Pozgay, Marblehead, MA (US)

(73) Assignee: Raytheon Company, Waltham, MA (US)

( * ) Notice: Subject to any disclaimer, the term of this patent is extended or adjusted under 35 U.S.C. 154(b) by 207 days.

(21) Appl. No.: 12/757,371

(22) Filed: Apr. 9, 2010

(65) Prior Publication Data

US 2011/0248796 A1    Oct. 13, 2011

(51) Int. Cl.
*H01Q 3/00* (2006.01)
*G01S 3/16* (2006.01)
*G01S 5/02* (2010.01)

(52) U.S. Cl.
USPC ............................ 342/373; 342/384; 342/427

(58) Field of Classification Search ................... 342/427, 342/373, 384
See application file for complete search history.

(56) References Cited

U.S. PATENT DOCUMENTS

| | | | |
|---|---|---|---|
| 3,091,743 A | 5/1963 | Wilkinson | |
| 3,665,480 A | 5/1972 | Fassett | |
| 4,075,566 A | 2/1978 | D'Arcangelis | |
| 4,489,363 A | 12/1984 | Goldberg | |

(Continued)

FOREIGN PATENT DOCUMENTS

| | | |
|---|---|---|
| EP | 0 481 417 A1 | 4/1992 |
| EP | 1 764 863 A1 | 3/2007 |

(Continued)

OTHER PUBLICATIONS

Bash et al.,; "Improving Heat Transfer From a Flip-Chip Package;" Technology Industry; Email Alert RSS Feed; Hewlett-Packard Journal, Aug. 1997; 3 pages.

(Continued)

*Primary Examiner* — Gregory C Issing
(74) *Attorney, Agent, or Firm* — Daly, Crowley, Mofford & Durkee, LLP

(57) ABSTRACT

A feed network for an antenna subarray includes a first feed arrangement having an sum output, a second feed arrangement having an delta output, a fixed attenuator having a first port and a second port, the first port connected to the delta output of the second feed arrangement, a first power divider/combiner having a first and second port and a third port; the first port connected to the second port of the fixed attenuator, a variable phase shifter having a first port and a second port, the first port connected to the second port of the power divider/combiner, a variable attenuator having a first port and a second port, the first port connected to the second port of the variable phase shifter, a second power divider/combiner having a first and second port and a third port; the first port connected to the second port of the fixed attenuator, a first circulator having a first port, a second port and a third port, the first port connected to the sum output of the first feed arrangement, and a third power divider/combiner having a first and second port and a third port; the third port connected to the second port of the circulator and the second port connected to the second port of the variable attenuator.

12 Claims, 13 Drawing Sheets

U.S. PATENT DOCUMENTS

| | | | |
|---|---|---|---|
| 4,527,165 A | 7/1985 | deRonde | |
| 4,612,548 A * | 9/1986 | Beltran | 342/373 |
| 4,658,256 A * | 4/1987 | Piele | 342/383 |
| 4,698,663 A | 10/1987 | Sugimoto et al. | |
| 4,706,094 A | 11/1987 | Kubick | |
| 4,751,513 A | 6/1988 | Daryoush et al. | |
| 4,835,658 A | 5/1989 | Bonnefoy | |
| 5,005,019 A | 4/1991 | Zaghloul et al. | |
| 5,055,852 A | 10/1991 | Dusseux et al. | |
| 5,099,254 A | 3/1992 | Tsukii et al. | |
| 5,166,690 A * | 11/1992 | Carlson et al. | 342/157 |
| 5,276,452 A | 1/1994 | Schuss et al. | |
| 5,276,455 A | 1/1994 | Fitzsimmons et al. | |
| 5,398,010 A | 3/1995 | Klebe | |
| 5,400,040 A | 3/1995 | Lane et al. | |
| 5,404,148 A | 4/1995 | Zwarts | |
| 5,412,414 A | 5/1995 | Ast et al. | |
| 5,451,969 A | 9/1995 | Toth et al. | |
| 5,459,474 A | 10/1995 | Mattioli et al. | |
| 5,488,380 A | 1/1996 | Harvey et al. | |
| 5,493,305 A | 2/1996 | Wooldridge et al. | |
| 5,506,589 A * | 4/1996 | Quan et al. | 342/373 |
| 5,563,613 A | 10/1996 | Schroeder et al. | |
| 5,592,363 A | 1/1997 | Atarashi et al. | |
| 5,675,345 A | 10/1997 | Pozgay et al. | |
| 5,724,048 A | 3/1998 | Remondiere | |
| 5,786,792 A | 7/1998 | Bellus et al. | |
| 5,854,607 A | 12/1998 | Kinghorn | |
| 5,907,304 A | 5/1999 | Wilson et al. | |
| 6,011,507 A | 1/2000 | Curran et al. | |
| 6,037,903 A | 3/2000 | Lange et al. | |
| 6,061,027 A | 5/2000 | Legay et al. | |
| 6,078,289 A | 6/2000 | Manoogian et al. | |
| 6,087,988 A | 7/2000 | Pozgay | |
| 6,091,373 A | 7/2000 | Raguenet | |
| 6,104,343 A | 8/2000 | Brookner et al. | |
| 6,127,985 A | 10/2000 | Guler | |
| 6,166,705 A | 12/2000 | Mast et al. | |
| 6,181,280 B1 | 1/2001 | Kadambi et al. | |
| 6,184,832 B1 | 2/2001 | Geyh et al. | |
| 6,208,316 B1 | 3/2001 | Cahill | |
| 6,211,824 B1 | 4/2001 | Holden et al. | |
| 6,218,214 B1 | 4/2001 | Panchou et al. | |
| 6,222,493 B1 | 4/2001 | Caille et al. | |
| 6,225,695 B1 | 5/2001 | Chia et al. | |
| 6,297,775 B1 | 10/2001 | Haws et al. | |
| 6,388,620 B1 | 5/2002 | Bhattacharyya | |
| 6,424,313 B1 | 7/2002 | Navarro et al. | |
| 6,480,167 B2 | 11/2002 | Matthews | |
| 6,483,705 B2 | 11/2002 | Snyder et al. | |
| 6,611,180 B1 | 8/2003 | Puzella et al. | |
| 6,621,470 B1 | 9/2003 | Boeringer et al. | |
| 6,624,787 B2 | 9/2003 | Puzella et al. | |
| 6,661,376 B2 | 12/2003 | Maceo et al. | |
| 6,670,930 B2 | 12/2003 | Navarro | |
| 6,686,885 B1 | 2/2004 | Barkdoll et al. | |
| 6,703,976 B2 | 3/2004 | Jacomb-Hood et al. | |
| 6,711,814 B2 | 3/2004 | Barr et al. | |
| 6,731,189 B2 | 5/2004 | Puzella et al. | |
| 6,756,684 B2 | 6/2004 | Huang | |
| 6,856,210 B2 | 2/2005 | Zhu et al. | |
| 6,900,765 B2 | 5/2005 | Navarro et al. | |
| 6,943,300 B2 | 9/2005 | Ekeberg et al. | |
| 6,961,248 B2 | 11/2005 | Vincent et al. | |
| 6,995,322 B2 | 2/2006 | Chan et al. | |
| 7,030,712 B2 | 4/2006 | Brunette et al. | |
| 7,061,446 B1 | 6/2006 | Short, Jr. et al. | |
| 7,129,908 B2 | 10/2006 | Edward et al. | |
| 7,132,990 B2 | 11/2006 | Stenger et al. | |
| 7,180,745 B2 | 2/2007 | Mandel et al. | |
| 7,187,342 B2 | 3/2007 | Heisen et al. | |
| 7,298,235 B2 | 11/2007 | Hauhe et al. | |
| 7,348,932 B1 | 3/2008 | Puzella et al. | |
| 7,417,598 B2 | 8/2008 | Navarro et al. | |
| 7,443,354 B2 | 10/2008 | Navarro et al. | |
| 7,444,737 B2 | 11/2008 | Worl | |
| 7,489,283 B2 | 2/2009 | Ingram et al. | |
| 7,508,338 B2 | 3/2009 | Pluymers et al. | |
| 7,597,534 B2 | 10/2009 | Hopkins | |
| 7,671,696 B1 | 3/2010 | Puzella et al. | |
| 2005/0110681 A1 | 5/2005 | Londre | |
| 2005/0151215 A1 | 7/2005 | Hauhe et al. | |
| 2006/0268518 A1 | 11/2006 | Edward et al. | |
| 2007/0152882 A1 | 7/2007 | Hash et al. | |
| 2008/0106467 A1 | 5/2008 | Navarro et al. | |
| 2008/0106482 A1 | 5/2008 | Cherrette et al. | |
| 2008/0150832 A1 | 6/2008 | Ingram et al. | |
| 2008/0316139 A1 | 12/2008 | Blaser et al. | |

FOREIGN PATENT DOCUMENTS

| | | |
|---|---|---|
| EP | 1 436 859 B1 | 8/2007 |
| EP | 1 978 597 A1 | 10/2008 |
| JP | 4-122107 A | 4/1992 |
| JP | 06-097710 | 4/1994 |
| JP | 07-212125 | 8/1995 |
| JP | 2000-138525 A | 5/2000 |
| JP | 2003 179429 A | 6/2003 |
| JP | 2005 505963 | 2/2005 |
| KR | 1020010079872 A | 8/2001 |
| WO | WO 98/26642 | 6/1998 |
| WO | WO 99/66594 | 12/1999 |
| WO | WO 01/20720 A1 | 3/2001 |
| WO | WO 01/41257 A1 | 6/2001 |
| WO | WO 03/03031 A1 | 4/2003 |
| WO | WO 2007/136941 A2 | 11/2007 |
| WO | WO 2007/136941 A3 | 11/2007 |
| WO | WO 2008/010851 A2 | 1/2008 |
| WO | WO 2008/010851 A3 | 1/2008 |
| WO | WO 2008/036469 A1 | 3/2008 |

OTHER PUBLICATIONS

Carter; "'Fuzz Button' Interconnects at Microwave and MM-Wave Frequencies;" IEEE Seminar; London, UK; Mar. 1-Mar. 6, 2000; 7 sheets.

Jerinic, et al.; "X-Band "Tile" Array for Mobile Radar;" internal Raytheon Company publication; Spring 2003; 4 pages.

Marsh et al.; "5.4 Watt GaAs MESFET MMIC for Phased Array Radar Systems;" 1997 Workshop on High Performance Electron Devices for Microwave and Optoelectronic Applications, Nov. 24-25, 1997; pp. 169-174.

Puzella, et al.; "Digital Subarray for Large Apertures;" slide presentation; internal Raytheon Company publication; Sep. 14, 2004; pp. 1-22.

Div. Application (with translation of amended claims) as filed on Dec. 1, 2008 in Korean Intellectual Property office and assigned App. No. 10-2008-7029396.

Decision of Rejection dated Jul. 30, 2008 from KR Pat. App. No. 10-2004-7003900.

Notice of Trial Decision dated Mar. 23, 2010 from KR Pat. App. No. 10-2004-7003900.

EP Search Report for 06021905.2; dated Feb. 9, 2007; 8 pages.

European Office Action dated Nov. 3, 2005 from EP Pat. App. No. 02800372.1.

Response to European Office Action filed Jan. 12, 2007 from EP Pat. App. No. 02800372.1.

European Office Action dated Oct. 18, 2007 from EPO Pat. App. No. 06021905.2.

Response to European Office Action dated Oct. 18, 2007 filed in the EPO on Aug. 11, 2008 from EP Pat. App. No. 06021905.2.

Response to European Office Action dated Mar. 19, 2009 filed in the EPO on Nov. 19, 2009 from EP Pat. App. No. 06021905.2.

European Office Action dated Feb. 18, 2010 from EPO Pat. App. No. 06021905.2.

Notice of Allowance dated Feb. 2, 2007 from EP Pat. App. No. 02800372.1.

Korean Office Action dated Oct. 31, 2007 from KR Pat. App. No. 10-2004-7003900.

Response to Korean Office Action filed Mar. 26, 2008 from KR Pat. App. No. 10-2004-7003900.

Korean Office Action dated Feb. 25, 2009 from KR Pat. App. No. 10-2008-7029396.

Korean Office Action dated Nov. 27, 2009 from KR Pat. App. No. 10-2008-7029396.

Japanese Office Action dated Mar. 7, 2007 from JP Pat. App. No. 2003-533378.

Japanese Office Action dated Feb. 15, 2008 from JP Pat. App. No. 2003-533378.

Japanese Office Action dated Feb. 18, 2009 from JP Pat. App. No. 2003-533378.

Response to Japanese Office Action filed Jul. 5, 2007 from JP App. No. 2003-533378.

Response to Japanese Office Action filed Jun. 19, 2009 from App JP App. No. 2003-533378.

Office Action dated Jun. 11, 2010 from U.S. Appl. No. 12/694,450.

Response to Office Action of Jun. 11, 2010 from U.S. Appl. No. 12/694,450 dated Sep. 21, 2010.

Notice of Allowance dated Nov. 3, 2010 from U.S. Appl. No. 12/482,061.

Office action dated Dec. 1, 2010 from U.S. Appl. No. 12/694,450.

PCT International Preliminary Examination Report and Written Opinion of the ISA for PCT/US2002/30677 dated Nov. 27, 2003; 10 pages.

PCT Search Report mailed on Dec. 19, 2007 for PCT Pat. App. No. PCT/US2007/074795 filed on Jul. 31, 2007.

PCT Written Opinion mailed on Dec. 19, 2007 for PCT Pat. App. No. PCT/US2007/074795 filed on Jul. 31, 2007.

PCT International Preliminary Examination Report mailed on Apr. 2, 2009 for PCT Pat. App. No. PCT/US2007/074795 filed on Jul. 31, 2007.

U.S. Appl. No. 12/694,450, filed Jan. 27, 2010, file through Dec. 8, 2010, 312 pages.

U.S. Appl. No. 12/482,061, filed Jun. 10, 2009, file through Dec. 8, 2010, 196 pages.

U.S. Appl. No. 12/566,818, filed Sep. 25, 2009, file through Dec. 8, 2010, 129 pages.

U.S. Appl. No. 12/580,356, filed Oct. 16, 2009, file through Dec. 14, 2010, 148 pages.

U.S. Appl. No. 12/880,350, filed Sep. 13, 2010 filed through Dec. 14, 2010, 45 pages.

PCT Search Report of the ISA dated Jun. 20, 2011 for PCT Pat. App. No. PCT/US2011/028063; 5 pages.

PCT Written Opinion of the ISA dated Jun. 20, 2011 for PCT Pat. App. No. PCT/US2011/028063; 6 pages.

U.S. Appl. No. 12/484,626, filed Jun. 15, 2009, file through Nov. 12, 2010, Part A, 435 pages.

U.S. Appl. No. 12/484,626, filed Jun. 15, 2009, file through Nov. 12, 2010, Part B, 218 pages.

U.S. Appl. No. 12/484,626, filed Jun. 15, 2009, file through Nov. 12, 2010, Part C, 218 pages.

U.S. Appl. No. 12/484,626, filed Jun. 15, 2009, file through Nov. 12, 2010, Part D, 215 pages.

U.S. Appl. No. 10/441,366, filed May 20, 2003, file through Nov. 12, 2010, 91 pages.

U.S. Appl. No. 12/533,178, filed Jul. 31, 2009, file through Nov. 12, 2010, 183 pages.

U.S. Appl. No. 12/533,185, filed Jul. 31, 2009 file through Nov. 12, 2010, 180 pages.

PCT International Preliminary Report on Patentability, PCT/US2011/028063, dated Oct. 9, 2012, 1 page.

PCT Written Opinion of the International Searching Authority, PCT/US2011/028063, dated Oct. 9, 2012, 6 pages.

PCT Notification Concerning Transmittal of International Preliminary Report on Patentability (Chapter I of the Patent Cooperation Treaty) dated Oct. 18, 2012, 1 page.

* cited by examiner

RF FEED NETWORK FOR MODULAR ACTIVE APERTURE ELECTRONICALLY STEERED ARRAYS

FIELD OF THE INVENTION

This invention relates generally to phased array antennas adapted for volume production at a relatively low cost and more particularly Active Electronically Steered Arrays (AESAs) including a plurality of subarray panels where each one of the subarray panels are interchangeable.

BACKGROUND OF THE INVENTION

Phased array antennas include a plurality of antenna elements spaced apart from each other by known distances coupled through a plurality of phase shifter circuits to either or both of a transmitter or receiver. There is a desire to lower acquisition and life cycle costs of radio frequency (RE) systems which utilize phased array antennas (or more simply "phased arrays"). One way to reduce costs when fabricating RF systems is to utilize printed wiring boards (PWBs) (also sometimes referred to as printed circuit boards or PCBs) which allow use of more effective manufacturing techniques.

As is known, phased array antenna systems are adapted to produce a beam of radio frequency energy (RF) and direct such beam along a selected direction by controlling the phase (via the phase shifter circuitry) of the RF energy passing between the transmitter or receiver and the array of antenna elements. In an electronically scanned phased array, the phase of the phase shifter circuits (and thus the beam direction) is selected by sending a control signal or word to each of the phase shifter sections. The control word is typically a digital signal representative of a desired phase shift, as well as a desired attenuation level and other control data.

Phased array antennas are often used in both defense and commercial electronic systems. For example, Active Electronically Scanned Arrays (AESAs) are in demand for a wide range of defense and commercial electronic systems such as radar surveillance, terrestrial and satellite communications, mobile telephony, navigation, identification, and electronic counter measures. Such systems are often used in radar for land base, ship and airborne radar systems and satellite communications systems. Thus, the systems are often deployed on a single structure such as a ship, aircraft, missile system, missile platform, satellite or building where a limited amount of space is available.

AESAs offer numerous performance benefits over passive scanned arrays as well as mechanically steered apertures. However, the costs that can be associated with deploying AESAs can limit their use to specialized military systems. An order of magnitude reduction in array cost could enable widespread AESA insertion into military and commercial systems for radar, communication, and electronic warfare (EW) applications. The performance and reliability benefits of AESA architectures could extend to a variety of platforms, including ships, aircraft, satellites, missiles, and submarines. Reducing fabrication costs and increasing the demand of components can drive down the costs of AESAs.

Many conventional phased array antennas use a so-called "brick" type architecture. In a brick architecture, radio frequency (RF) signals and power signals fed to active components in the phased array are generally distributed in a plane that is perpendicular to a plane coincident with (or defined by) the antenna aperture.

Another architecture for phased array antennas is the so-called "panel" or "tile" architecture. With a tile architecture, the RF circuitry and signals are distributed in a plane that is parallel to a plane defined by the antenna aperture. The tile architecture uses basic building blocks in the form of "tiles" wherein each tile can be formed of a multi-layer printed circuit board structure including antenna elements and its associated RF circuitry encompassed in an assembly, and wherein each antenna tile can operate by itself as a substantially planar phased array or as a sub-array of a much larger array antenna.

With the need to have larger antenna apertures and the desire to reduce cost, it has become common to develop the antenna aperture as an array of active aperture subarrays. These subarrays typically have their own internal RF power dividers, driver amplifiers, time delay units, logic distribution networks, DC power distribution networks, DC/DC converters and accessible ports for RF, logic, DC power and thermal management interfaces. It would desirable if each of the subarrays could be manufactured the same and be used interchangeably in the fabrication of the complete array. But when the aperture is formed from subarrays, it has, heretofore, lacked flexibility because the RF distribution networks required for receive beam formation and exciter output distribution are hardwired into the aperture backplane and position dependent in detail, i.e typical AESA apertures are not configured such that the subarrays are interchangeable.

It would, therefore, be desirable to provide an AESA including a plurality of subarray panels where each one of the subarray panels could be interchangeable and therefore facilitate modular aperture construction techniques and reduce cost.

SUMMARY OF THE INVENTION

In accordance with the techniques described herein, a feed network for an antenna subarray includes a first feed arrangement having a sum output, a second feed arrangement having an delta output, a fixed attenuator having a first port and a second port, the first port connected to the delta output of the second feed arrangement, a first power divider/combiner having a first and second port and a third port; the first port connected to the second port of the fixed attenuator, a variable phase shifter having a first port and a second port, the first port connected to the second port of the power divider/combiner, a variable attenuator having a first port and a second port, the first port connected to the second port of the variable phase shifter, a second power divider/combiner having a first and second port and a third port; the first port connected to the second port of the fixed attenuator, a first circulator having a first port, a second port and a third port, the first port connected to the sum output of the first feed arrangement, and a third power divider/combiner having a first and second port and a third port; the third port connected to the second port of the circulator and the second port connected to the second port of the variable attenuator.

With this particular technique, the subarray can act as a building block and be combined and interchangeable with other subarrays to provide a modular, AESA (i.e. an array of such subarrays can be used to form an active phased array antenna). With all of the subarrays being the same, an array is provided which is lower cost than prior art approaches.

In accordance with a further aspect of the inventive concepts described herein, a panel array includes a plurality of antenna subarrays, each subarray comprising a plurality of radiators; a plurality of transmit-receive modules, each one of the transmit-receive modules coupled to a respective one of the plurality of radiators; a plurality of RF couplers, each one connected to a respective one of said plurality of transmit-receive modules; a first feed arrangement of uniform power dividers coupled to said plurality of RF couplers; a second feed arrangement of uniform power dividers coupled to said plurality of RF couplers; a first circulator having a feed port, a transmit port and a sum port, the feed port connected to said first feed arrangement; a second circulator having a feed port, a transmit port and a sum port, the transmit port connected to the transmit port of the first circulator; a first power divider/combiner having a first and second port and a third port; the third port connected to the sum port of the first circulator and the second port connected to the sum port of the second circulator; a variable attenuator connected to the second port of the first power divider/combiner; a variable phase shifter connected to the variable attenuator.

As mentioned above, the relatively high cost of phased arrays has precluded the use of phased arrays in all but the most specialized applications. Assembly and component costs, particularly for active transmit/receive channels, are major cost drivers. It would be advantageous to provide a sub-array for an Active Electronically Scanned Array (AESA) that is compact, which can be manufactured in a cost-effective manner and that can be used interchangeably to assemble an AESA.

BRIEF DESCRIPTION OF THE DRAWINGS

The foregoing features of this invention, as well as the invention itself, may be more fully understood from the following description of the drawings in which:

FIG. 1A is an expanded view of a plurality of couplers used in the subarray antenna shown in FIG. 1;

Figure 1:
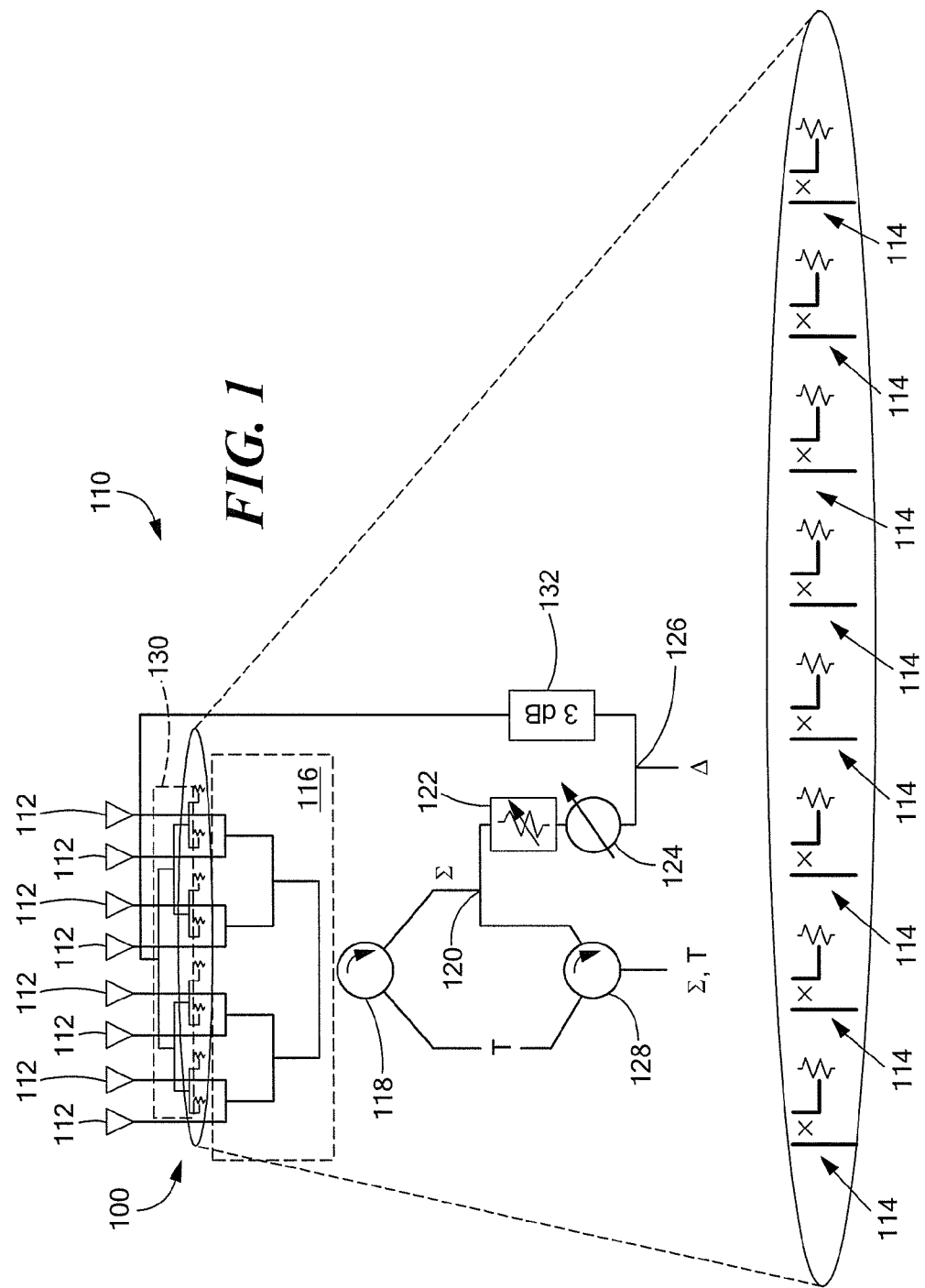
FIG. 1 is a block diagram a sub-array showing the inventive concept.

It should be understood that in an effort to promote clarity in the drawings and the text, the drawings are not necessarily to scale, emphasis instead is generally placed upon illustrating the principles of the invention.

DESCRIPTION OF THE PREFERRED EMBODIMENTS

Before describing the various embodiments of the invention, some introductory concepts and terminology are explained. A "brick" type architecture refers to radio frequency (RF) signals and power signals fed to active components in the phased array that are generally distributed in a plane that is perpendicular to a plane coincident with (or defined by) the antenna aperture. A "panel array" (or more simply "panel") refers to a multilayer printed wiring board (PWB) which includes an array of antenna elements (or more simply "radiating elements" or "radiators"), as well as RF, logic and DC distribution circuits in one highly integrated PWB. A panel is also sometimes referred to herein as a tile array (or more simply, a "tile").

An array antenna may be provided from a single panel (tile or brick array) or from a plurality of panels of tile or brick arrays. In the case where an array antenna is provided from a plurality of panels, a single one of the plurality of panels is sometimes referred to herein as a "panel sub-array" (or a "tile sub-array").

Reference is sometimes made herein to an array antenna having a particular number of panels. It should of course, be appreciated that an array antenna may be comprised of any number of panels and that one of ordinary skill in the art will appreciate how to select the particular number of panels to use in any particular application.

It should also be noted that reference is sometimes made herein to a panel or an array antenna having a particular array shape and/or physical size or a particular number of antenna elements. One of ordinary skill in the art will appreciate that the techniques described herein are applicable to various sizes and shapes of panels and/or array antennas and that any number of antenna elements may be used.

Thus, although the description provided herein below describes the inventive concepts in the context of an array antenna having a substantially square or rectangular shape and comprised of a plurality of tile sub-arrays having a substantially square or rectangular-shape, those of ordinary skill in the art will appreciate that the concepts equally apply to other sizes and shapes of array antennas and panels (or tile sub-arrays) having a variety of different sizes, shapes, and types of antenna elements. Also, the panels (or tiles) may be arranged in a variety of different lattice arrangements including, but not limited to, periodic lattice arrangements or configurations (e.g. rectangular, circular, equilateral or isosceles triangular and spiral configurations) as well as non-periodic or other geometric arrangements including arbitrarily shaped array geometries.

Reference is also sometimes made herein to the array antenna including an antenna element of a particular type, size and/or shape. For example, one type of radiating element is a so-called patch antenna element having a square shape and a size compatible with operation at a particular frequency (e.g. 10 GHz) or range of frequencies (e.g. the X-band frequency range). Reference is also sometimes made to a so-called "stacked patch" antenna element. Those of ordinary skill in the art will recognize, of course, that other shapes and types of antenna elements (e.g. an antenna element other than a stacked patch antenna element) may also be used and that the size of one or more antenna elements may be selected for operation at any frequency in the RF frequency range (e.g. any frequency in the range of about 1 GHz to about 100 GHz). The types of radiating elements which may be used in the antenna of the present invention include but are not limited to notch elements, dipoles, slots or any other antenna element (regardless of whether the element is a printed circuit element) known to those of ordinary skill in the art.

It should also be appreciated that the antenna elements in each panel or sub-array can be provided having any one of a plurality of different antenna element lattice arrangements including periodic lattice arrangements (or configurations) such as rectangular, square, triangular (e.g. equilateral or isosceles triangular), and spiral configurations as well as non-periodic or arbitrary lattice arrangements. The concepts taught herein are applicable to both brick type antenna arrays and tile type antenna arrays as well as any phased array antenna having multiple antenna elements manufactured as sub-arrays and combined to complete the entire array.

Applications of at least some embodiments of the panel array architectures described herein include, but are not limited to, radar, electronic warfare (EW) and communication systems for a wide variety of applications including ship based, airborne, missile and satellite applications. It should thus be appreciated that the panel (or sub-array) described herein can be used as part of a radar system or a communications system. As will also be explained further herein, at least some embodiments of the invention are applicable, but not limited to, military, airborne, shipborne, communications, unmanned aerial vehicles (UAV) and/or commercial wireless applications.

The sub-arrays to be described herein below can also utilize embedded circulators; a slot-coupled, polarized egg-crate radiator; a single integrated monolithic microwave integrated circuit (MMIC); and a passive radio frequency (RF) circuit architecture. For example, as described further herein, technology described in the following commonly assigned United States patents can be used in whole or in part and/or adapted to be used with at least some embodiments of the tile subarrays described herein: U.S. Pat. No. 6,611,180, entitled "Embedded Planar Circulator"; U.S. Pat. No. 6,624,787, entitled "Slot Coupled, Polarized, Egg-Crate Radiator"; U.S. Pat. No. 6,731,189, entitled "Multilayer Stripline Radio Frequency Circuits and Interconnection Methods"; U.S. Pat. No. 7,348,932, entitled "Tile Sub-array and Related Circuits and Techniques."; and/or U.S. patent application Ser. No. 12/484,626, entitled "Panel Array" filed on Jun. 15, 2009. Each of the above patents is hereby incorporated herein by reference in their entireties.

Before describing an embodiment of the invention, it may be helpful to review the state of the art of AESAs. The principle reason subarrays are not interchangeable in known radars is that conventional AESA feed architectures that support interchangeability produce difference pattern grating lobes. For example, in a linear array which includes 12 (or M) interchangeable subarrays of 8 (or N) phase centers each. The subarray outputs are fed with a lossless uniform corporate power divider in order to achieve maximum transmit efficiency. The aperture is large and we wish to have a wide instantaneous bandwidth, so a time-delay unit is associated with the output of each subarray. Each subarray has an internal uniform 8-way (or N-way) power divider. Each phase center of the array has an associated radiator and T/R module. A module includes low noise and power amplifiers, one phase shifter and one variable attenuator. In receive mode, the variable attenuators are invoked to produce the desired low sidelobe sum illumination distribution; as the variable attenuators follow receive amplification, their primary contribution to system noise figure is the illumination efficiency. This is also the source of the difference pattern grating lobe problem, presuming low sidelobe difference pattern response is desired.

The very poor sidelobe response of these difference patterns is due to strong illumination discontinuities. The strongest of all is the phase monopulse discontinuity across the aperture middle. Here the discontinuity is so dominant it swamps the entire sidelobe structure. According to our understanding of discontinuous functions, a centered discontinuity cannot be removed, so phase monopulse patterns will have filled-in high sidelobes. On the other hand, the sidelobe structures for the other difference patterns are produced by repeated discontinuities of varying weight. Though they are indeed grating lobes, they do not display difference pattern nulls; they are, however, 180 degrees out of phase across the main beam as they should be. In order to avoid the difference pattern grating lobe problem, one typically uses subarray configurations with RF feed components unique to the location of the subarray within the array.

In an AESA, the signal-to-noise ratio (S/N or SNR) is essentially established at the aperture. T/R gains are set such that losses between the T/Rs and the receiver have minimal effect on overall system noise temperature. For this reason, we have numerous RF distribution network options that are not available for passive Electronically Steered Arrays (ESAs). For example, if the outputs of all elements of an AESA are equally divided between multiple functions, say sum and both differences, the noise power is equally distributed to each function. This is not to say that the SNR is the same for each function, but that the SNR of the sum channel is unchanged and noise filling the difference pattern tracking nulls is consistent with the SNR of the sum channel. A similar feed configuration in an ESA would degrade sum channel SNR by 4.77 dB.

The selection of RF feed configuration in an AESA will affect system dynamic range. With this in mind, it is instructive to consider the possible illumination function combinations that have been or may be used in AESA architectures. Uniform transmit illuminations are desirable, as are low sidelobe sum and difference illuminations. At present, one known aperture achieves total independence of the three functions by establishing transmit and sum distributions at the T/R module, and, very ingeniously, by establishing the difference distributions as the ratio of desired difference distributions divided by the design sum distribution. The latter transmit and sum distributions can therefore be achieved with total positional independence of the RF feed networks, but the difference distributions can only be achieved with total positional dependence of the RF feed networks. Then, using this architecture for a rectangular aperture with $M_s$ columns of $N_s$ subarrays, $M_s$ distinct subarray azimuth distribution network designs and $N_s$ distinct subarray elevation distribution network designs are required and for a new aperture comprised of the same physical subarrays configured in $M'_s$ columns of $N'_s$ subarrays, an entirely new set of designs is required.

Because of the completely independent manner in which the difference pattern illumination distribution is achieved, difference patterns can be generated with sidelobe levels as low as the sum pattern sidelobes. The tradeoff in this is usually null slope vs. sidelobe level; the Bayliss distribution maximizes null slope for a given sidelobe level, but even with the Bayliss distribution, a steeper slope can be obtained by increasing difference pattern sidelobe level design objectives. An alternate approach to difference function implementation is to select a difference illumination that depends functionally on the sum illumination. Two examples are the truncated Rayleigh and Taylor derivative illuminations. Both these illuminations are derivative illuminations, that is, their patterns are the transform space derivatives of particular sum patterns. The Rayleigh is the derivative of the pattern obtained from a truncated Gaussian illumination distribution, and the Taylor derivative is the derivative of the pattern obtained from the Taylor illumination distribution. In general, the derivative illumination is obtained from the Fourier transform relations $$g(y) = \int_{-\infty}^{\infty} f(x) \cdot e^{jxy} dx \quad \text{Eq. 1}$$

and $$j^n \frac{d^n}{dy^n} g(y) = \int x^n \cdot f(x) \cdot e^{jxy} dx \quad \text{Eq. 2}$$

There is, of course, no guarantee that a particular derivative illumination will produce a low sidelobe difference pattern, but Rayleigh, derivative Taylor and derivative $\cos^m(\pi x/L)$ distributions are known to do so. In general, the derivative pattern has the same sidelobe falloff as the generating sum pattern and a higher sidelobe level.

To show the inventive concept, let the sampled sum distribution of a subarrayed linear array be defined as $g_{m,n}$, where in is the subarray number, $1 \leq m \leq M$, and n is the element index within a subarray, $1 \leq n \leq N$. If $d_x$ is the spacing between elements, the elements are centered on x=0 and the elements are counted from $x_{1,1} = -x_{max}$, then the derivative distribution is given as $$x_{m,n} \cdot g_{m,n} = \quad \text{Eq. 3}$$
$$\left\{ n \cdot d_x + \left[ (m-1) \cdot N - \frac{M \cdot N + 1}{2} \right] \cdot d_x \right\} \cdot g_{m,n} / (M \cdot N \cdot d_x)$$

where the position dependence has been normalized to the full width of the array. After a bit of algebra, we can rewrite equation 3 as $$x_{m,n} \cdot g_{m,n} = \left[ \frac{(n-1/2)}{M \cdot N} + \frac{2 \cdot (m-1) \cdot N - M \cdot N}{2 \cdot M \cdot N} \right] \cdot g_{m,n} \quad \text{Eq. 4}$$

The derivative illumination can be cast as the sum of terms exclusively weighted at the subarray level, and those exclusively weighted at the element level. But what is significant here is that the element level weighting is independent of the sub-array in which the element actually resides, yet it contains detailed information about the slope of the ramp multiplying the sum distribution. The derivative illumination can be formed exactly provided we can extract two independent RF copies of $g_{m,n}$ at each subarray output. Unfortunately we cannot, but we can get one exact copy and one very good approximation, and we can perform the addition operation at RF.

FIG. 1 shows a subarray 100 with a feed circuit 110 that approximately performs the operations defined by Equation 4. As shown in FIG. 1, each one of a plurality of antenna elements 112, here 8, are connected to a port of a respective one of a plurality of radio frequency couplers 114. It should be understood for the sake of simplicity the antenna elements 112 are shown simply as antenna elements, but in some embodiments will include a transmit/receive module in combination with an antenna elements. Antenna elements 112 may include a single element or a plurality of elements being fed by a single source. A second port of each one of the plurality of radio frequency couplers 114 are connected to a feed arrangement 116 to combine, in a receive mode, the signals where the output of the feed arrangement 116 is connected to a port of a circulator 118. The feed arrangement 116 is made up of a plurality of Wilkinson power dividers/combiners or similar four-port structures in a known manner. A second port of the circulator 118 provides a sum (Σ) signal and a third port of the circulator 118 receives a transmit (T) signal. The output port of the circulator 118 with the sum signal is connected to an input port of a power divider 120 also having two output ports. One of the output ports of the power divider 120 is connected to an input port of a variable attenuator 122 having an output port connected to an input port of a variable phase shifter 124. The output of the phase shifter 124 is connected to an input port of a power combiner 126. The second output port of the power divider 120 is connected to a port of circulator 128. The third port of the circulator 118 is connected a second port of circulator 128 for the transmit signal path. A third port of circulator 128 provides the sum signal for further processing or receives a transmit signal. A third port of each one of the plurality of radio frequency couplers 114 is connected to a feed arrangement 130 to combine, in a receive mode, the signals where the output of the feed arrangement 130 is connected to an input port of a 3 dB attenuator 132. It should be noted the fourth port of each one of the radio frequency couplers 114 are terminated in a known manner. An output port of the 3 dB attenuator 132 is connected to a second port of the power combiner 126. The output port of the power combiner 126 provides a delta (Δ) signal for further processing. It should be appreciated the above circuitry was described in the receive mode and in a transmit mode the signal flow would be in the opposite direction with power dividers acting as power combiners and power combiners acting as power dividers.

Both combining circuits (feed arrangements) (shown as binary, but not necessarily so) include uniform power dividers. Note good engineering practice will have a loaded fourth port at each junction of the power dividers. Total path length between couplers and summing point and dispersion along the paths must be carefully controlled. The values for the couplers 114 are obtained from the first term in brackets of Equation 4. The value of the 3-dB pad 132 is nominal, and would depend on the losses in the circulator and distribution networks; some if not all could be taken up in the unspecified attenuator which has a minimum attenuation value of 3 dB. The value for the unspecified RF attenuator 122 is obtained from the second term in brackets of Equation 4. By replacing a fixed attenuator with a variable attenuator 122, the circuit can be used for any subarray building the aperture. In a similar manner, a variable phase shifter 124 is used where the value of the variable phase shifter 124 is obtained from the second term in brackets of Equation 4. With a variable attenuator 122 and a variable phase shifter 124, the feed circuit 100 for a subarray can be used to build an aperture of any (even) number of subarrays without hardware modification. It is this feature that makes this subarray 100 with feed circuit 110 most useful with modular AESA techniques.

An error generated by the circuit affects both the sum and difference distributions. Let $c_n$, be the voltage coupling values for the element couplers. Then the through-line voltage is $(1-c_n^2)^{1/2}$ and Equation 4 becomes $$x_{m,n} \cdot g_{m,n} = \frac{(n-1/2)}{M \cdot N} \cdot g_{m,n} + \qquad \text{Eq. 5}$$
$$\frac{2 \cdot (m-1) \cdot N - M \cdot N}{2 \cdot M \cdot N} \cdot g_{m,n} \cdot \sqrt{1 - [(n-1/2)/M \cdot N]^2}$$

which produces an error, $\epsilon_{m,n}$ $$\varepsilon_{n,m} = \qquad \text{Eq. 6}$$
$$\frac{2 \cdot (m-1) \cdot N - M \cdot N}{2 \cdot M \cdot N} \cdot g_{m,n} \cdot \left(1 - \sqrt{1 - [(n-1/2)/M \cdot N]^2}\right) \approx$$
$$\frac{2 \cdot (m-1) - M}{4 \cdot M} \cdot g_{m,n} \cdot [(n-1/2)/M \cdot N]^2$$

Equation 6 gives the voltage error contribution as a function of position within the array. Examination of the expression shows that the maximum error contribution term is inversely proportional to 4 times the square of the number of subarrays in the array. Since the number of subarrays in a subarrayed aperture is usually proportional to the system instantaneous bandwidth requirement, it appears that the error contribution is also inversely proportional to the square of the instantaneous bandwidth; a very pleasant fall out. To put the error contribution term in perspective, an aperture with 24 8-element subarrays would have a maximum error contribution term of about 33 dB below the sum pattern illumination. It is also important to note that the error contribution term of Equation 6 is always positive; that is, the total error is a sum pattern that has the characteristics of the second derivative of the generating illumination (i.e., the error illumination varies as the square of element position), implying that the central lobe of the error pattern will fill the difference pattern null. Fortunately, the effect is not as strong as the examination of maximum error indicates. Specifically, the minimum error, which varies inversely as $M^3$, occurs in the vicinity of generating function maximum. Also, as will be discussed below, the novel feed can be adjusted to minimize the overall error; typical null fill due to this error can be held to well below the systematic sidelobe level of the sum pattern.

Figure 2:
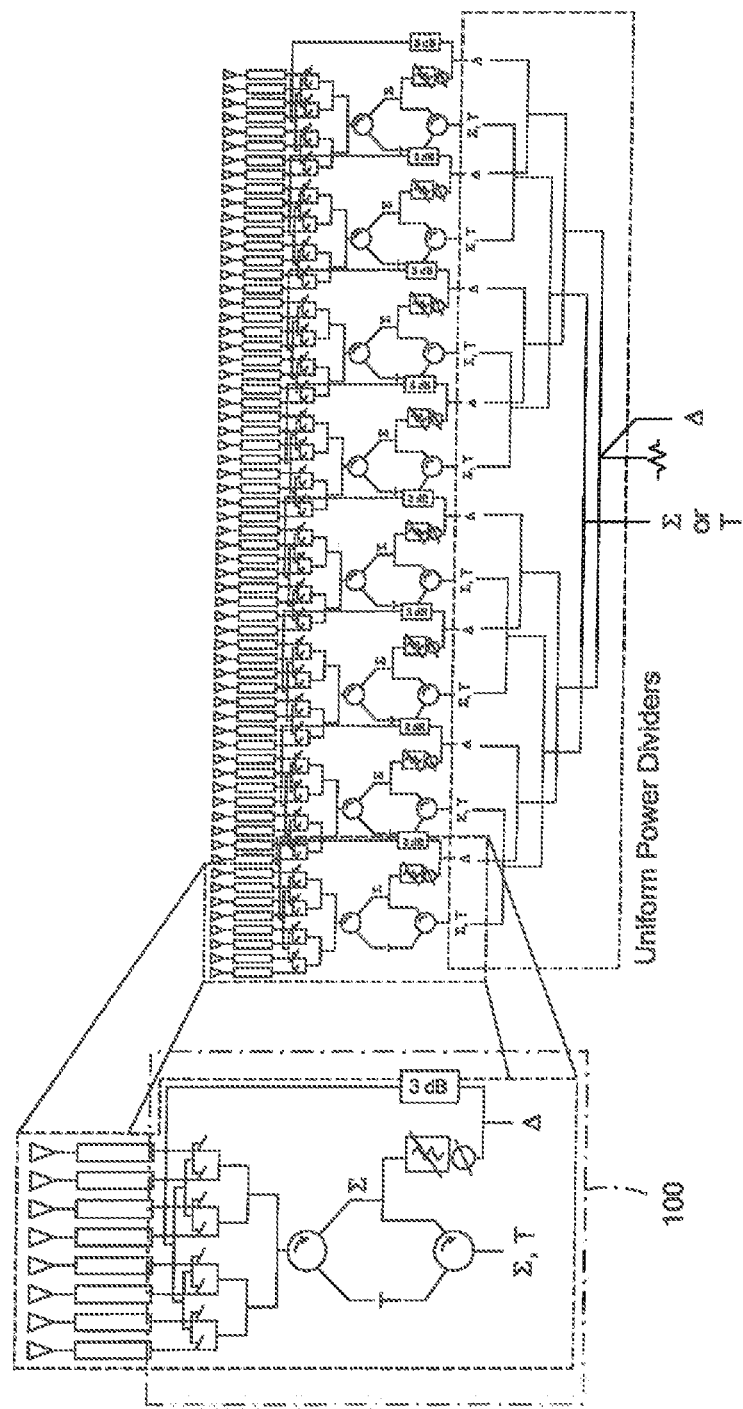
FIG. 2 is a schematic view of a linear array antenna formed from a plurality of sub-arrays.

Referring now to FIG. 2, a plurality of subarrays including subarray 100 is shown. In this embodiment, each of the subarrays are fabricated similar to subarray 100 and placed together to create here a 64-element linear array. Each of the subarrays can be fabricated the same to minimize the different types of subarrays that need to be fabricated as well as increase the number of subarrays being fabricated to drive down costs. Of course any number of subarrays can be combined to produce an array having a particular aperture. For example, twelve subarrays similar to subarray 100 could be used to create a 96 element array.

Figure 2A:
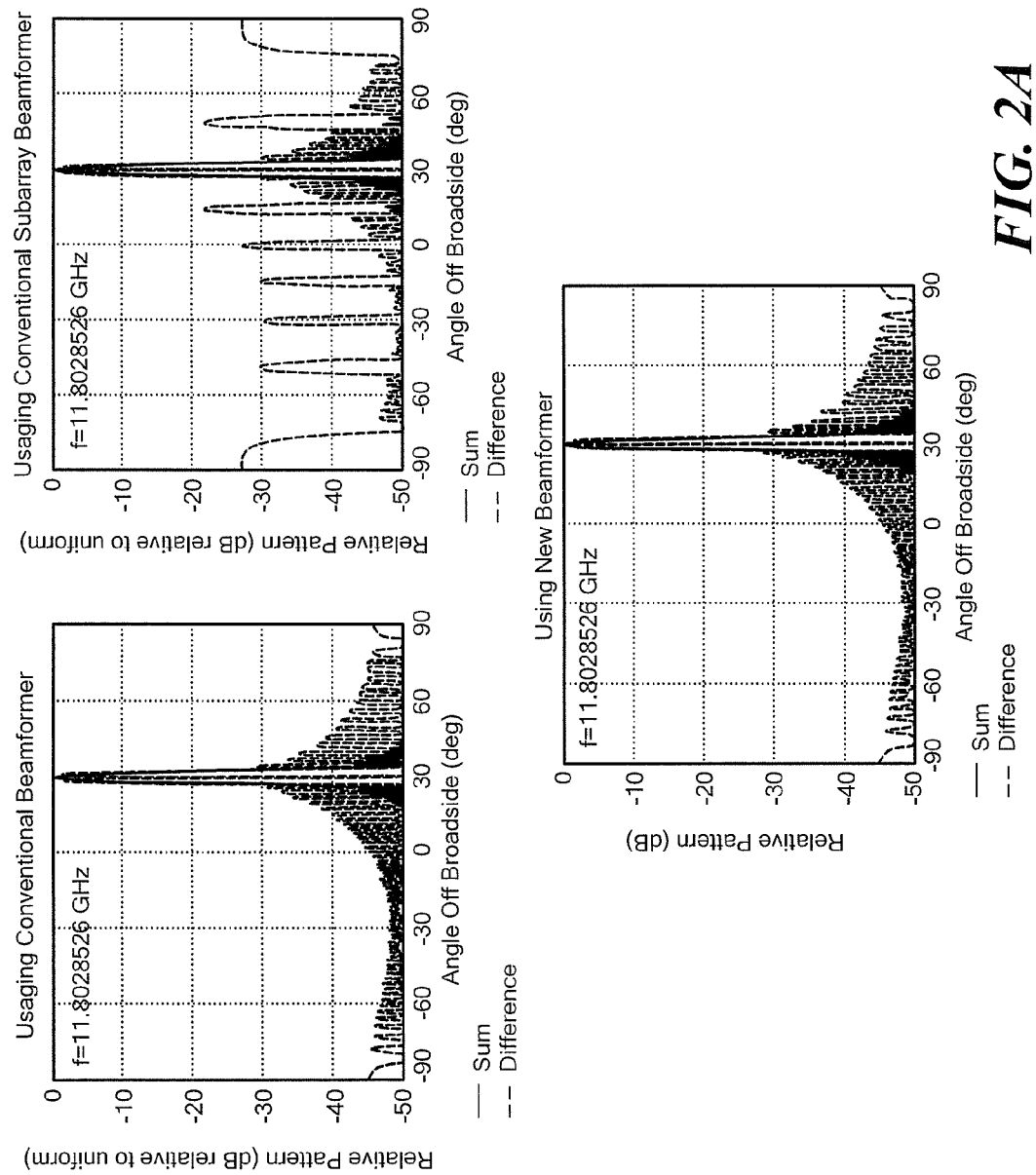
FIG. 2A includes three charts that compares results obtained for a 96-element linear array configured without subarrays, with conventional subarray configuration and with the new subarray configuration.

FIG. 2A includes three charts that compares results obtained for a 96-element linear array configured without subarrays, with conventional subarray configuration and with the new subarray configuration. In these simulations, the array operating frequency is selected to produce λ/2 spacing between radiators, the number of elements per subarray is set to 8 and additional difference channel amplification is assumed to properly normalize the difference to the sum. A closer look is given in FIG. 2B.

FIG. 2A addresses two issues. The first is that the desired reduction in the difference pattern grating lobes can be achieved. It is evident that the new beamformer provided by subarray 100 does indeed remove the lobes. The second is a tradeoff issue; namely, the derivative distributions have low sidelobes, but those low sidelobes are well above the level of the sum pattern sidelobes. As discussed above, very low sidelobe difference patterns can be obtained with an AESA architecture that trades subarray illumination functional dependence for subarray positional dependence. The tradeoff is sidelobe level in the difference pattern vs. a modular architecture.

The comparison patterns shown in FIG. 2A indicate the improvement the novel circuit used in subarray 100 can provide and the error due to incomplete feedback cancellation. As shown in FIG. 2A, the difference pattern grating lobes have been reduced by about 18 dB; a greater improvement would be realized with a more severe taper. As discussed previously in regard to the maximum illumination error, $\epsilon_{m,n}$, the effect of incomplete feedback cancellation is to partially fill the null, but only to a very low level; in this case approximately 70 dB below the sum beam peak.

Figure 2B:
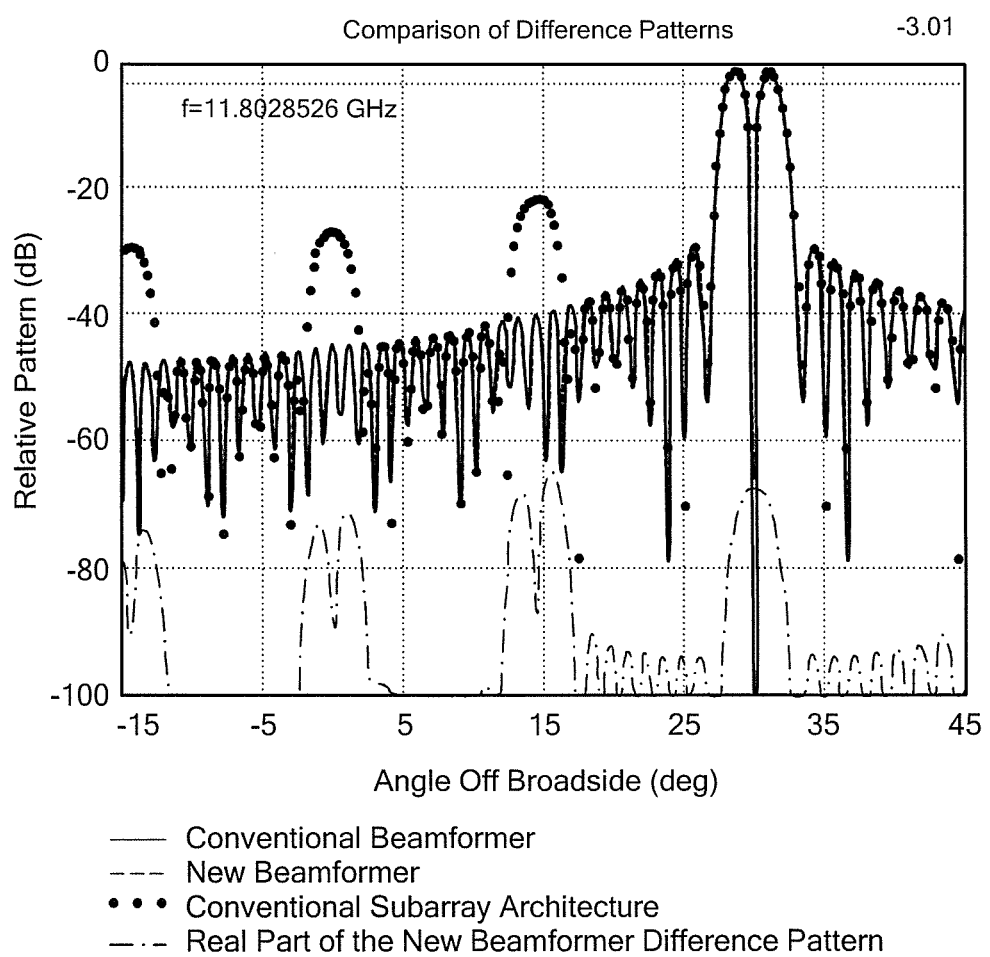
FIG. 2B is a chart showing a comparison of the difference patterns as an overlay of each other.

Referring now to FIG. 2B, a chart showing the comparison of the difference patterns of an array configured without subarrays (conventional beamformer), with conventional subarray configuration (conventional subarray architecture) and with the new subarray configuration (new beamformer) as an overlay to show in an alternative view the results described above in connection with FIG. 2A.

Figure 2C:
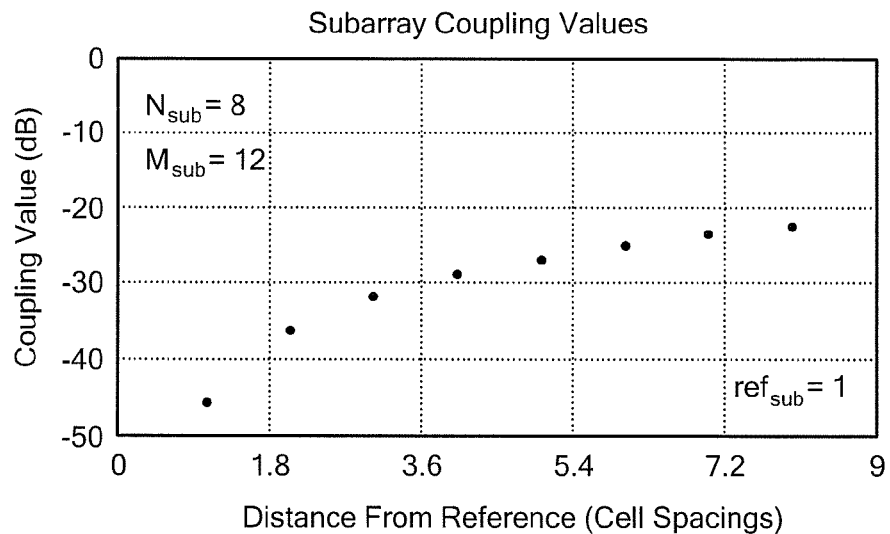
FIG. 2C is a chart showing typical feedback circuit coupling values.
Figure 2D:
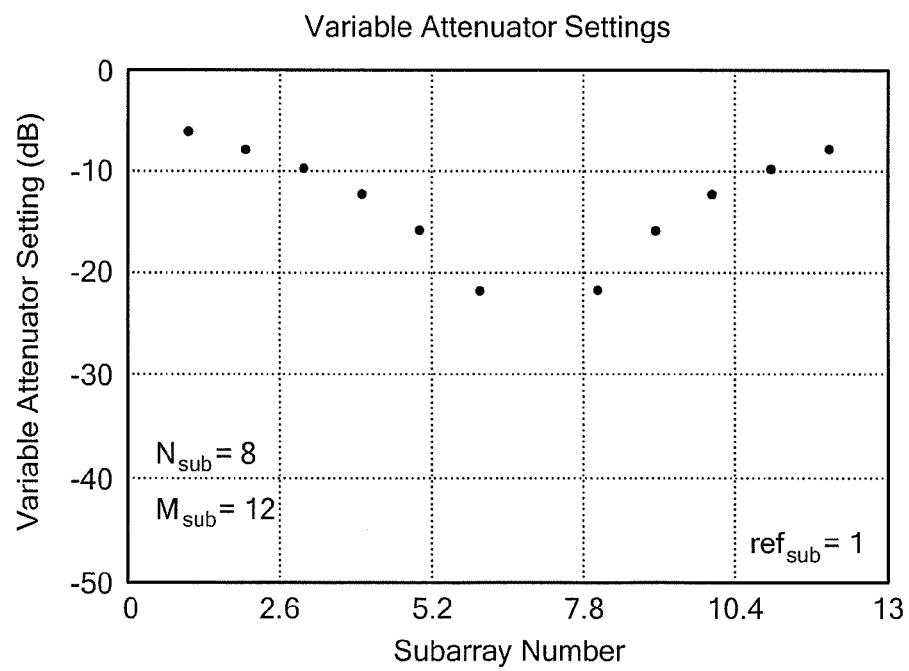
FIG. 2D is a chart showing typical attenuator values.

Referring now to FIG. 2C, typical feedback circuit coupling values are shown. These values are the first term in the square brackets of Equation 4. Typical variable attenuator values are shown in FIG. 2D. These values are the second term in the square brackets of Equation 4.

Figure 2E:
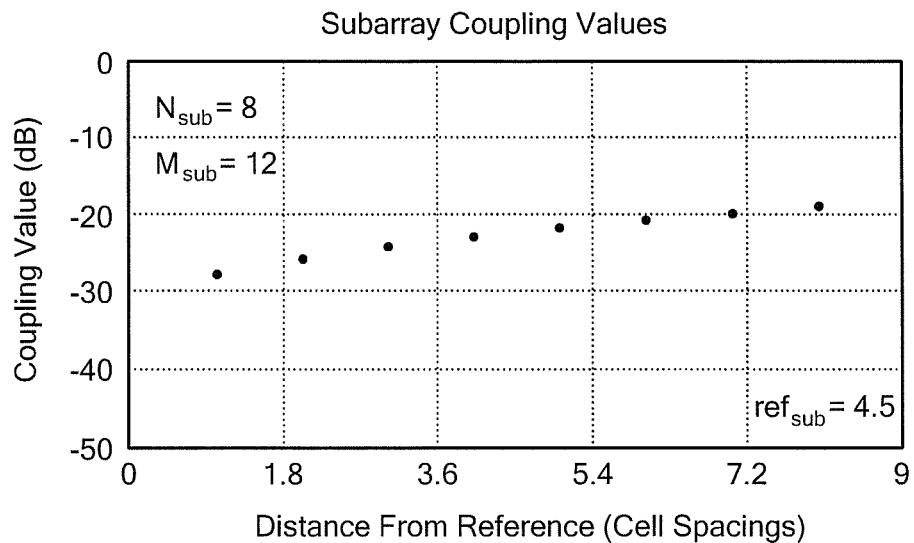
FIG. 2E is a chart showing typical coupling values when a reference is placed in the center of an 8-element subarray.
Figure 2F:
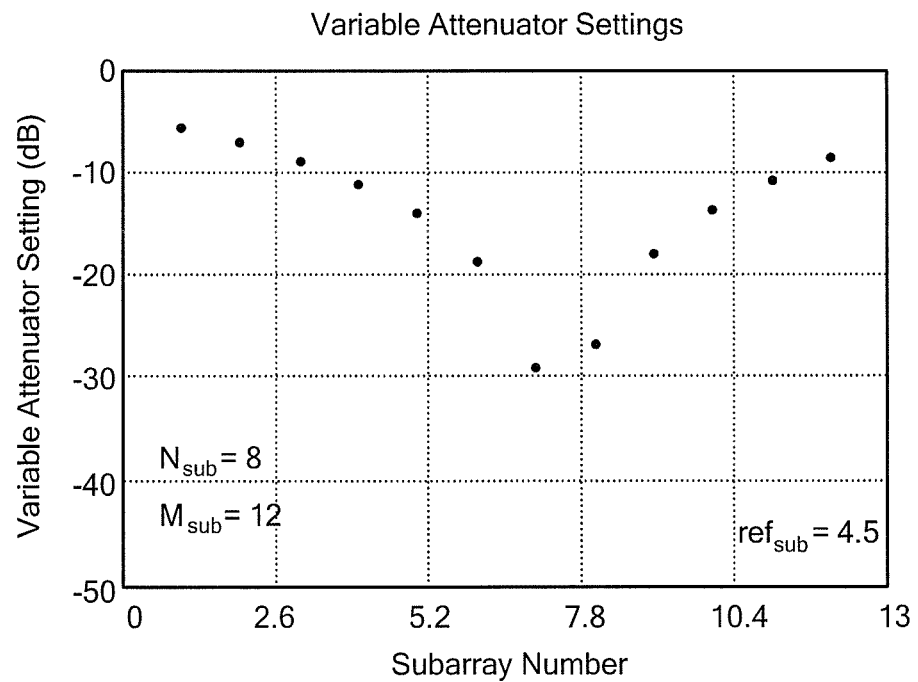
FIG. 2F is a chart showing typical attenuator values when a reference is placed in the center of an 8-element subarray.
Figure 2G:
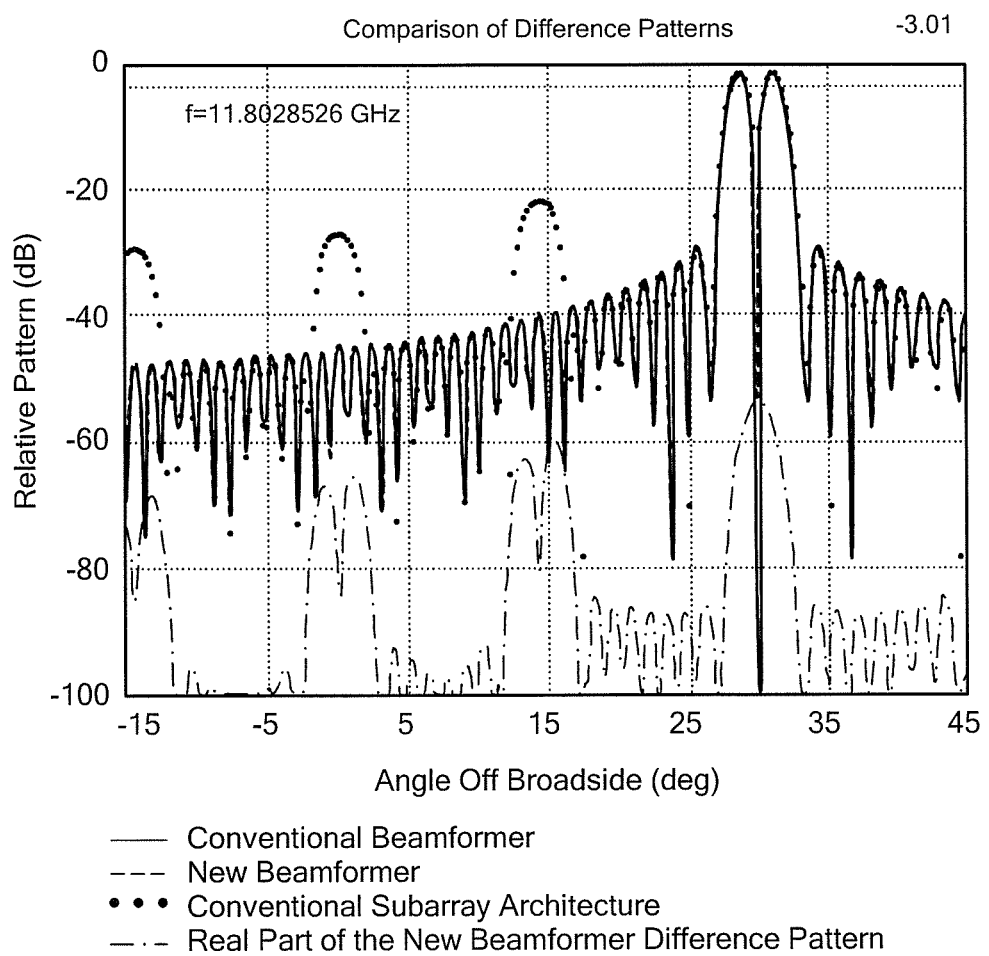
FIG. 2G is a chart showing a comparison of the difference patterns as an overlay of each other as the reference is shifted from the center.

A significant breakthrough with respect to modular array implementation has been the determination of a simple optimization that maintains coupler values above −25 dB throughout an array. The error represented in Equation 6 will remain small even if the reference point of the subarray is moved from the first element to some interior element. This reference point can be moved by the simple expedient of adding $n_{ref}/M*N$ to the first term in square brackets, then subtracting it from the second term. The reference can actually be moved outside the subarray in order to flatten the coupler distribution. This is particularly important for apertures with many small subarrays. For example, FIGS. 2E and 2F show coupler and variable attenuator settings required when the reference is placed in the center of the 8-element subarray. With this simple reset of the RF reference the loosest coupling value has been increase by 18.1 dB while the tightest coupling value has been increased by only 3.33 dB. As might be expected, the upper range of variable attenuator values does not change, while the lower end increases to compensate for the reference shift. When the reference is shifted well outside the subarray, variable attenuator settings shift as well, but the range of values is not significantly different from those depicted in FIG. 2F. It should be observed that shifting too far, say outside the physical bounds of the array creates new difficulties. The coupler distribution becomes too flat, tightening the tolerance on coupler manufacturing; and difference pattern null fill becomes unacceptably large. Shifting the reference does indeed increase the overall pattern error, as shown in FIG. 2G. However, the result is still considerably better than obtained with a conventional subarrayed architecture except in the null region. As FIG. 2G shows, the null has begun to fill in due to the more heavily excited symmetric contribution of the illumination distribution error. When the shift takes the reference outside a subarray, the null fills in to an unacceptable level.

It should be appreciated as with any system with post-amplification formation of difference patterns, the noise figure in the sum pattern can be maintained by setting the receive gain of the T/R module to a high enough level to overcome post amplification loss. In the subarray block diagram of FIG. 1, the primary excitation of the difference pattern is produced by equally splitting the received signal between sum and difference pattern feeds. At the split, signal and noise are equally divided between sum and difference outputs, and in the difference path with a variable attenuator 122 and variable phase shifter 124 following the split, signal and noise power are equally attenuated. The same is true for the coupled path with its fixed attenuator. The net result is that the noise power in the difference feed is reduced relative to the noise power in the sum channel feed by the ratio of total effective signal attenuation in the two channels. That is if the two signal attenuations are given (approximately) by $$\alpha_\Sigma = \frac{1}{M \cdot N} \cdot \sum_m \sum_n g_{m,n}^2 \qquad \text{Eq. 7}$$

and $$\alpha_\Delta = \frac{1}{M \cdot N} \cdot \sum_m \sum_n \left( \frac{x_{m,n}}{M \cdot N \cdot d_x} \cdot g_{m,n} \right)^2 \qquad \text{Eq. 8}$$

then the noise power ratio is approximately $\alpha_\Delta/\alpha_\Sigma$. The linear array excitations used in the examples here are a truncated Gaussian with 25 dB edge taper and its derivative, giving an approximate noise power ratio of −16.6 dB. Thus, in these cases, we can amplify the difference channel output by 16.6 dB without jeopardizing the system noise figure. This level of amplification has been included in the relative pattern plots presented above producing sum to difference peak response ratios of about 1.34 dB, and null fill well below the sum pattern sidelobe level.

Figure 2H:
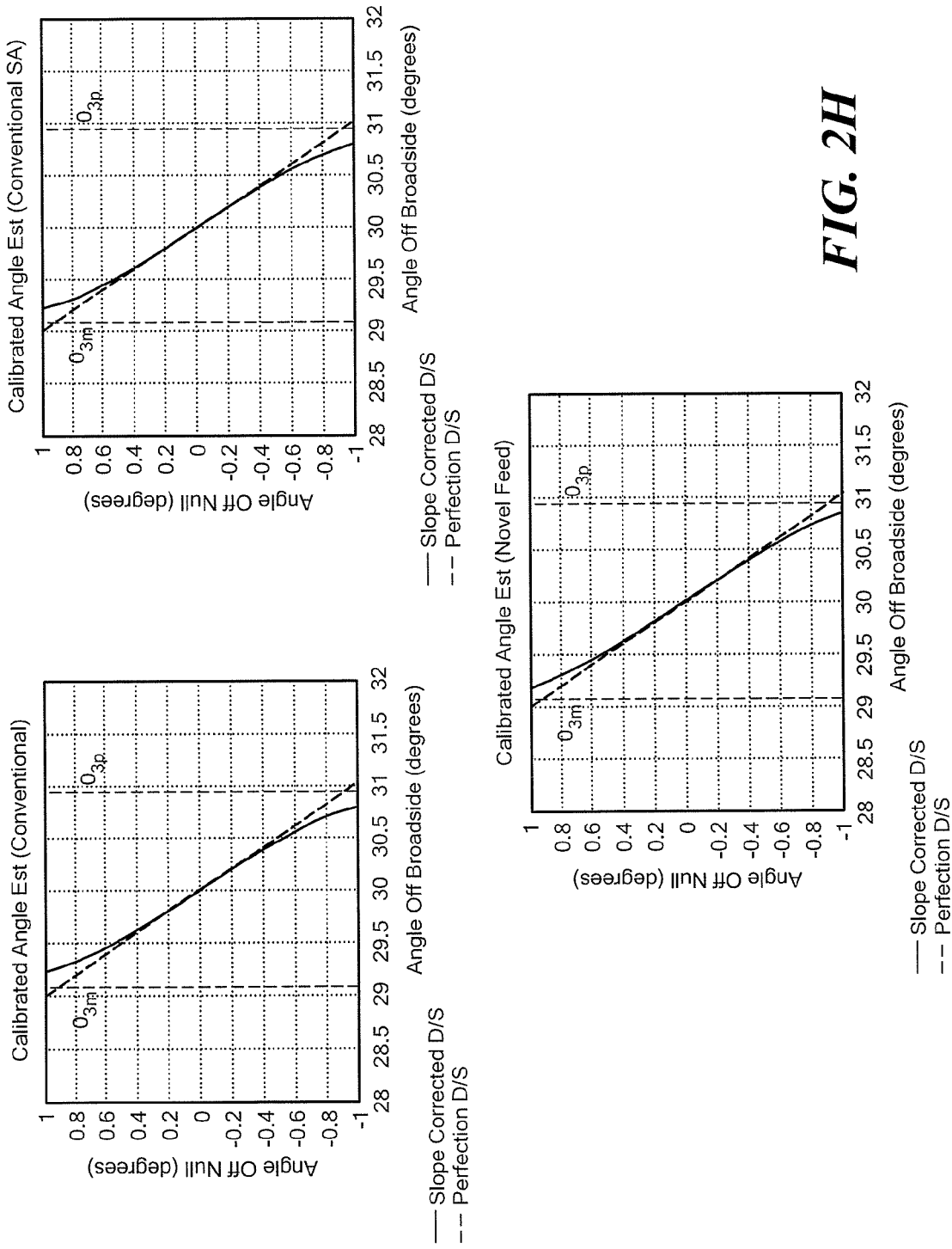
FIG. 2H is a chart showing angle off null estimates from calibrated 4/1 ratios for a conventional array in the first graph, a conventional subarrayed array in the second graph and the new array architecture in the third graph.

Although the novel feed circuit 110 produces low level null fill, the null slope is not adversely affected. FIG. 2H shows angle off null estimates from calibrated Δ/Σ ratios for a conventional array in the first graph, a conventional subarrayed array in the second graph and the new array architecture in the third graph. It is evident that there is little or no distinction between the angular responses of the three configurations shown in FIG. 2H.

Figure 3:
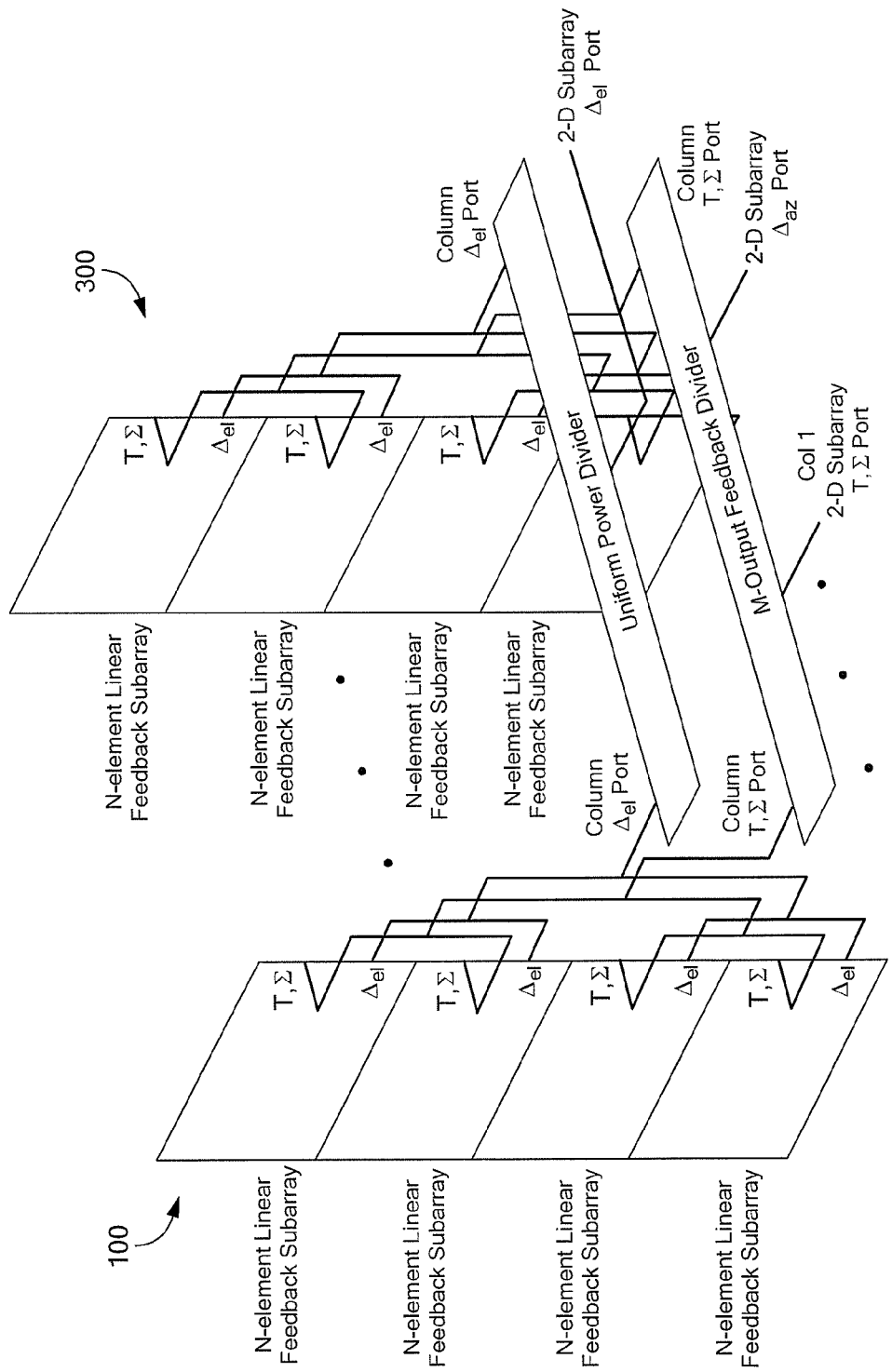
FIG. 3 is a schematic view of a two dimensional array with a plurality of subarrays arranged in a column with multiple columns arranged along in a row.

Referring now to FIG. 3, the technique taught above with respect to a linear array is now applied to a two dimensional array with a plurality of subarrays arranged in a column with multiple columns arranged along in a row. Here an array 300 is shown having four subarrays similar to subarray 100 stacked together in a column with each subarray providing a sum and delta elevation signal. A plurality of stacked arrays are provided, here M where M could be any number, where the outputs along a row are providing a delta azimuth signal. Using conventional combining techniques, a two dimensional array is then provided with a sum signal, a delta azimuth signal and a delta elevation signal being provided. It should be appreciated that although in the present embodiment four subarrays are shown to provide a column any number could be used. In a similar manner, the number of elements in each one of the subarrays could be eight, but another size could be used.

Figure 4:
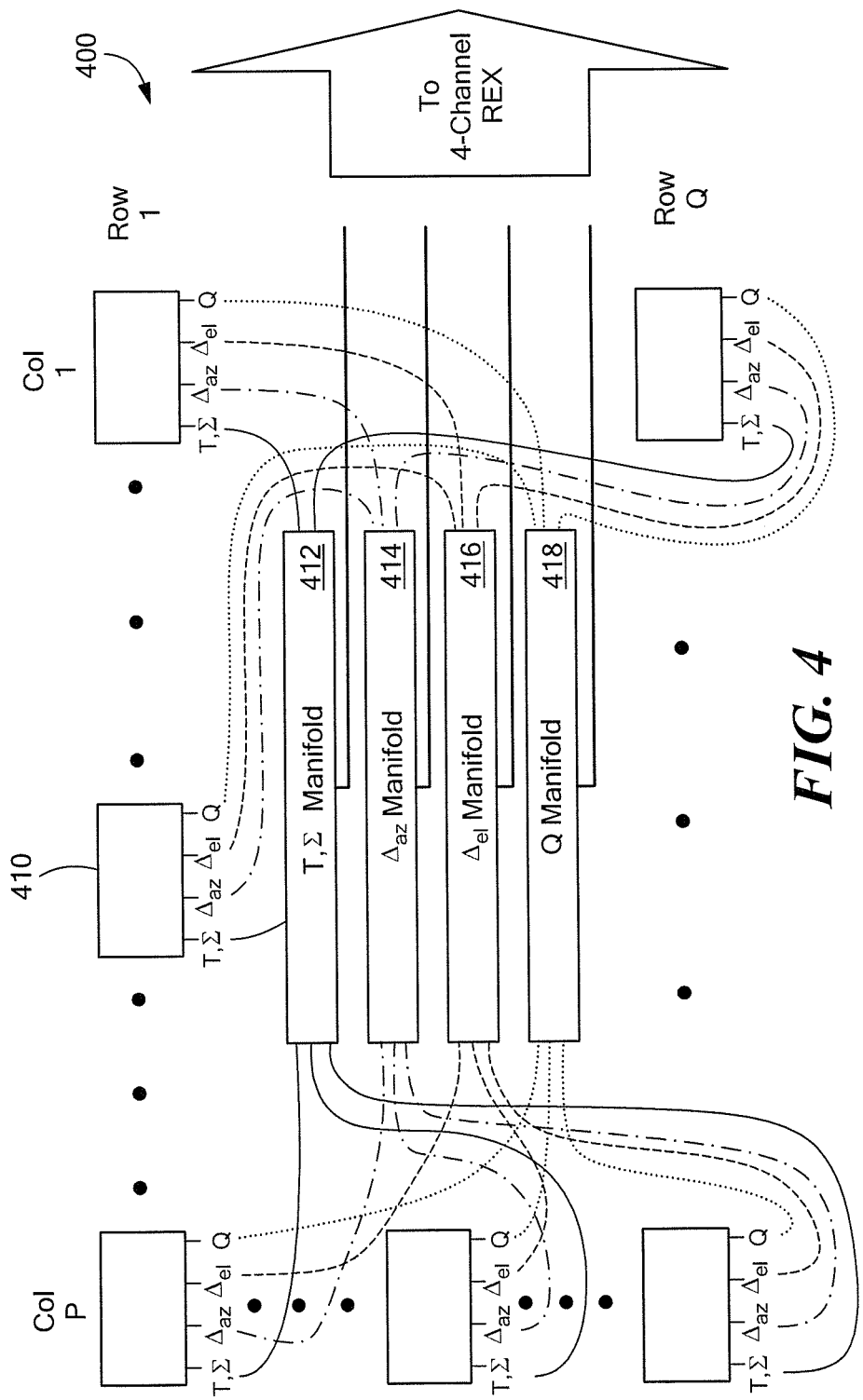
FIG. 4 is a block diagram of a two dimensional array with a plurality of subarrays arranged in a column with multiple columns arranged along in a row.

Referring now to FIG. 4, a two dimensional array 400 is shown with P columns and Q rows of two dimensional M×N Subarrays 410. Each one of the subarrays 410 are fabricated using the technique taught with FIG. 1 with M elements in a row and N elements in a column with each subarray providing monopulse signals to include a sum signal, a delta azimuth signal, a delta elevation signal and a Q signal in accordance with conventional monopulse arithmetic techniques. The monopulse signals from each one of the subarrays is fed into sum manifold 412, delta azimuth manifold 414, a delta elevation manifold 416 and a Q manifold 418, respectively, where using conventional monopulse arithmentic and electronically steering techniques, the signals are processed and then provided to a four channel receiver for further processing. It should now be appreciated using the circuit described above to fabricate subarray 410, only a single variety of a subarray 410 needs to be fabricated to build the array 400.

Figure 5:
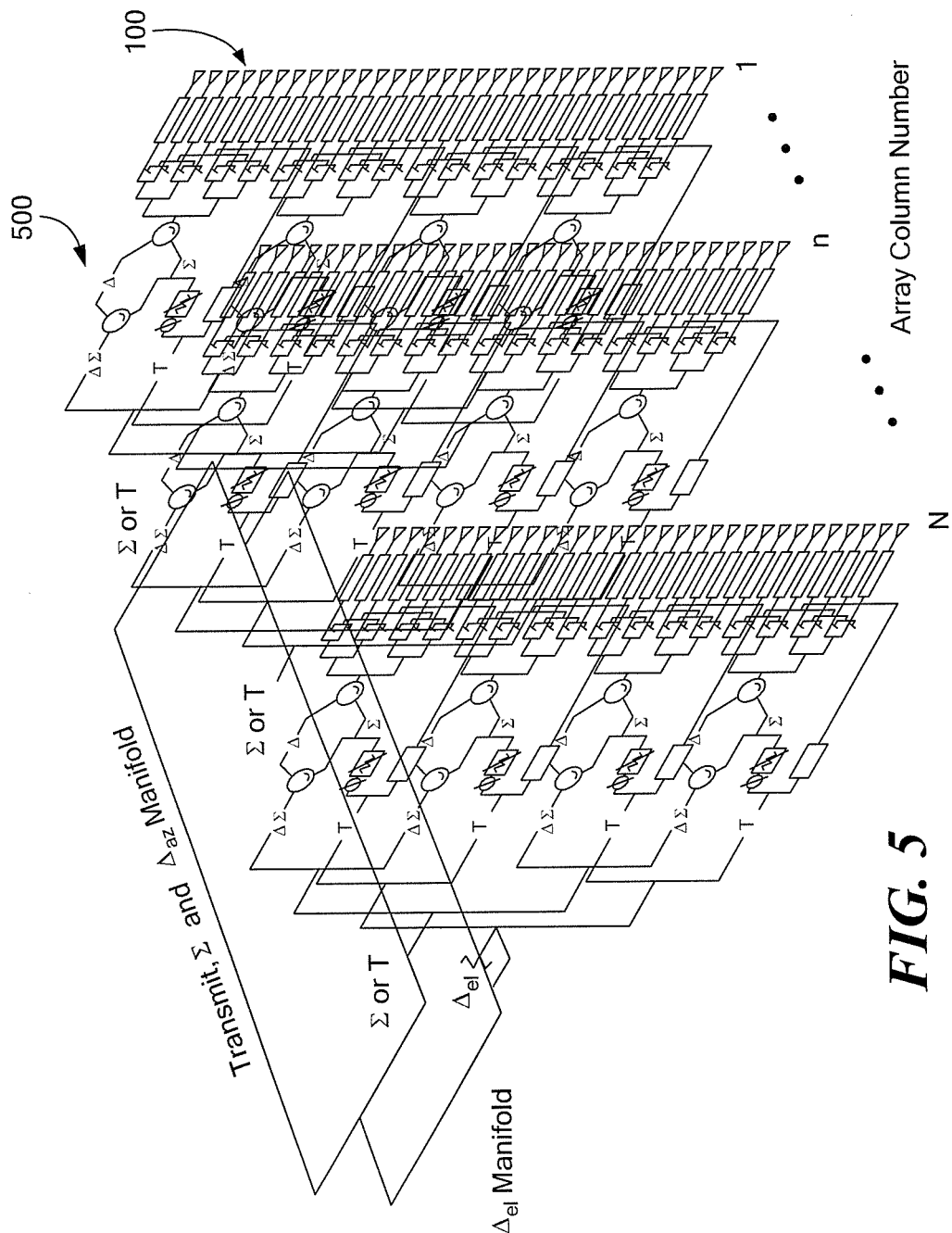
FIG. 5 is a block diagram of a two dimensional array with a plurality of subarrays arranged in a column with multiple columns arranged along in a row.

Referring now to FIG. 5, a two dimensional array 500 is shown with four subarrays 100 in each column and N columns in the array, for example N could be 8 or 16. Using printed wiring board techniques, a single column with multiple subarrays in the column can be fabricated and then the layers of the column arrays can be stacked to provide the array 500.

Figure 6:
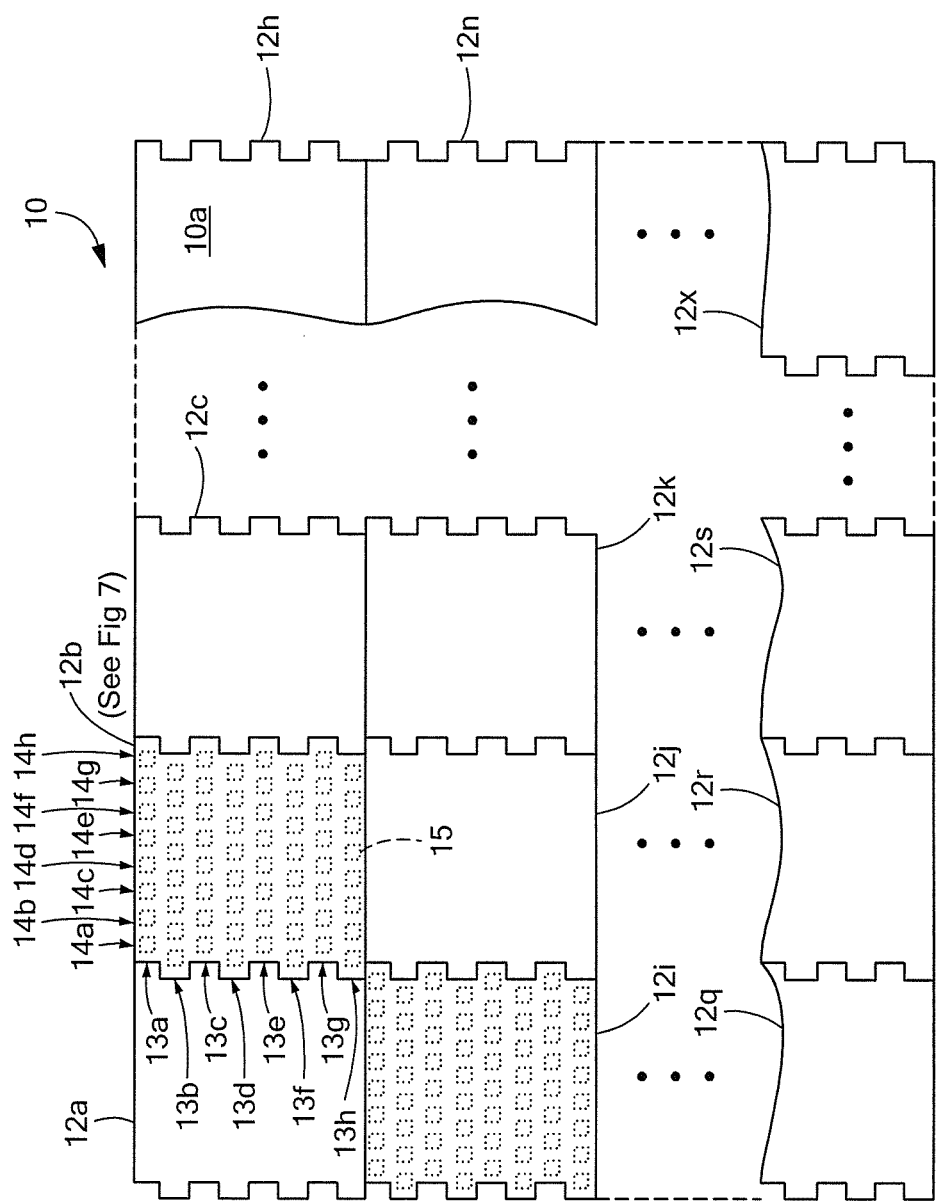
FIG. 6 is a plan view of an array antenna formed from a plurality of tile sub-arrays.

Referring now to FIG. 6, in one embodiment an array antenna 10 is comprised of a plurality of tile sub-arrays 12a-12x. It should be appreciated that in this exemplary embodiment, x total tile sub-arrays 12 comprise the entire array antenna 10. In one embodiment, the total number of tile sub-arrays is sixteen tile sub-arrays (i.e. x=16). The particular number of tile sub-arrays 12 used to provide a complete array antenna can be selected in accordance with a variety of factors including, but not limited to, the frequency of operation, array gain, the space available for the array antenna and the particular application for which the array antenna 10 is intended to be used. Those of ordinary skill in the art will appreciate how to select the number of tile sub-arrays 12 to use in providing a complete array antenna.

As illustrated in tiles 12b and 12i, in the exemplary embodiment of FIG. 6, each tile sub-array 12a-12x comprises eight rows 13a-13h of antenna elements 15 with each row containing eight antenna elements 14a-14h (or more simply, "elements 15"). Each of the tile sub-arrays 12a-12x is thus said to be an eight by eight (or 8×8) tile sub-array. It should be noted that each antenna element 15 is shown in phantom in FIG. 6 since the elements 15 are not directly visible on the exposed surface (or front face) of the array antenna 10. Thus, in this particular embodiment, each tile sub-array 12a-12x comprises sixty-four (64) antenna elements. In the case where the array 10 is comprised of sixteen (16) such tiles, the array 10 comprises a total of one-thousand and twenty-four (1,024) antenna elements 15.

In another embodiment, each of the tile sub-arrays 12a-12x comprise 16 elements. Thus, in the case where the array 10 is comprised of sixteen (16) such tiles and each tiles comprises sixteen (16) elements 15, the array 10 comprises a total of two-hundred and fifty-six (256) antenna elements 15.

In still another exemplary embodiment, each of the tile sub-arrays 12a-12x comprises one-thousand and twenty-four (1024) elements 15. Thus, in the case where the array 10 is comprised of sixteen (16) such tiles, the array 10 comprises a total of sixteen thousand three-hundred and eighty-four (16,384) antenna elements 15.

In view of the above exemplary embodiments, it should thus be appreciated that each of the tile sub-arrays can include any desired number of elements. The particular number of elements to include in each of the tile sub-arrays 12a-12x can be selected in accordance with a variety of factors including but not limited to the desired frequency of operation, array gain, the space available for the antenna and the particular application for which the array antenna 10 is intended to be used and the size of each tile sub-array 12. For any given application, those of ordinary skill in the art will appreciate how to select an appropriate number of radiating elements to include in each tile sub-array. The total number of antenna elements 15 included in an antenna array such as antenna array 10 depends upon the number of tiles included in the antenna array and as well as the number of antenna elements included in each tile.

It should be appreciated that each tile sub-array is electrically autonomous (excepting of course any mutual coupling which occurs between elements 15 within a tile and on different tiles). Thus, the RF feed circuitry which couples RF energy to and from each radiator on a tile is incorporated entirely within that tile (i.e. all of the RF feed and beamforming circuitry which couples RF signals to and from elements 15 in tile 12b are contained within tile 12b). As will be described in conjunction with FIG. 7 below, each tile includes one or more RF connectors and the RF signals are provided to the tile through the RF connector(s) provided on each tile sub-array.

Also, signal paths for logic signals and signal paths for power signals which couple signals to and from transmit/receive (or transmit-receive) (T/R) circuits are contained within the tile in which the T/R circuits exist and RF signals are provided to the tile through one or more power/logic connectors provided on the tile sub-array.

The RF beam for the entire array 10 is formed by an external beamformer (i.e. external to each of the tile subarrays 12) that combines the RF outputs from each of the tile sub-arrays 12a-12x. As is known to those of ordinary skill in the art, the beamformer may be conventionally implemented as a printed wiring board stripline circuit that combines N sub-arrays into one RF signal port (and hence the beamformer may be referred to as a 1:N beamformer).

It should be appreciated that the embodiments of the tile sub-arrays described herein (e.g. tile sub-arrays 12a-12x) differ from conventional so-called "brick" array architectures in that the microwave circuits of the tile sub-arrays are contained in circuit layers which are disposed in planes that are parallel to a plane defined by a face (or surface) of an array antenna (e.g. surface 10a of array antenna 10) made up from the tiles. In the exemplary embodiment of FIG. 6, for example, the circuits provided on the layers of circuit boards from which the tiles 12a-12x are provided are all parallel to the surface 10a of array antenna 10. By utilizing circuit layers that are parallel to a plane defined by a face of an array antenna, the tile architecture approach results in an array antenna having a reduced profile (i.e. a thickness which is reduced compared with the thickness of conventional array antennas).

Advantageously, the tile sub-array embodiments described herein can be manufactured using standard printed wiring board (PWB) manufacturing processes to produce highly integrated, passive RF circuits, using commercial, off-the-shelf (COTS) microwave materials, and highly integrated, active monolithic microwave integrated circuits (MMIC's). This results in reduced manufacturing costs. Array antenna manufacturing costs can also be reduced since the tile sub-arrays can be provided from relatively large panels or sheets of PWBs using conventional PWB manufacturing techniques with all of the subarrays being the same.

Figure 7:
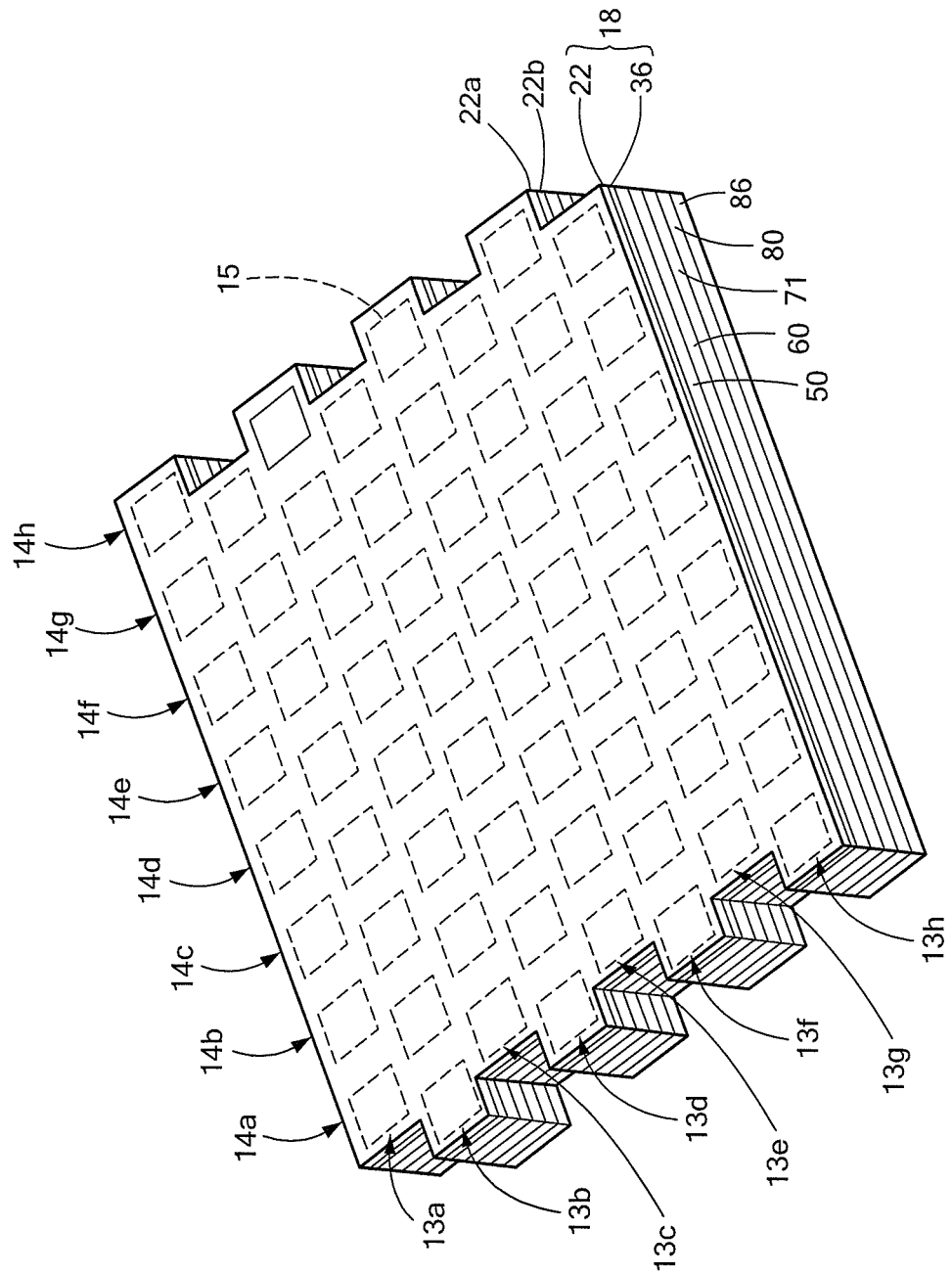
FIG. 7 is a perspective view of a tile sub-array of the type used in the array antenna shown in FIG. 6.

Referring now to FIG. 7 in which like elements of FIG. 6 are provided having like reference designations, and taking tile sub-array 12b as representative of tile sub-arrays 12a and 12c-12x, the tile sub-array 12b includes an upper multi-layer assembly (UMLA) 18. The UMLA 18 includes a radiator subassembly 22 which, in this exemplary embodiment, is provided as a so-called "dual circular polarized stacked patch egg-crate radiator" assembly which may be the same as or similar to the type described in U.S. Pat. No. 6,624,787 B2 entitled "Slot Coupled, Polarized, Egg-Crate Radiator" assigned to the assignee of the present invention and hereby incorporated herein by reference in its entirety. It should, of course, be appreciated that a specific type of radiator sub assembly is herein described only to promote clarity in the description provided by the drawings and text. The description of a particular type of radiator is not intended to be, and should not be construed as, limiting in any way. Thus, antenna elements other than stacked patch antenna elements may be used in the sub-array.

The radiator subassembly 22 is provided having a first surface 22a which can act as a radome and having a second opposing surface 22b. The radiator assembly 22 is comprised of a plurality of microwave circuit boards (also referred to as PWBs) (not visible in FIG. 7). Radiator elements 15 are shown in phantom in FIG. 7 since they are disposed below the surface 22a and thus are not directly visible in the view of FIG. 7.

The radiator subassembly 22 is disposed over an upper multi-layer (UML) board 36 (or UMLB 36). In an exemplary embodiment, the UML board 36 is comprised of eight individual printed circuit boards (PCBs) which are joined together to form the UML board 36. It should, of course, be appreciated that in other embodiments, UML board 36 may be comprised of fewer or more that eight PCBs. The UML board 36 includes RF feed circuits which couple RF signals to and from the antenna elements 15 provided as part of the radiator subassembly 22. The UMLB 36 is disposed over a first interconnect board 50. The interconnect board 50 is disposed over a circulator board 60 which in turn is disposed over a second interconnect board 71. The second interconnect board 71 is disposed over a lower multi-layer (LML) board 80 and the LML board 80 is disposed over a thermal spreader plate 86. The LML board 80 and thermal spreader plate 86 together with T/R modules 76 (not visible in FIG. 7) comprise a lower multi-layer assembly (LMLA) (not numbered).

In this particular example, each tile sub-array 12 includes sixty-four radiating antenna elements 15 which are uniformly distributed in a predetermined pattern (here a triangular lattice pattern) among eight rows of the sub-array (that is to say, each row of the tile sub-array includes the same number of antenna elements). In the exemplary design of FIGS. 6 and 7, each LMLA is adapted to couple to two rows of antenna elements 15 which constitutes sixteen (16) total antenna elements 15. Stated differently, each LMLA feeds a two-by-eight (2×8) portion of the sub-array 12b. Thus, since there are eight (8) rows of antenna elements in the tile sub-array 12b, and each LMLA feeds two rows, then four (4) LMLAs are required to feed the entire sub-array 12b. Since, in this exemplary embodiment, each of the tile sub-arrays 12a-12x comprise eight (8) rows of antenna elements, then each of the tile sub-arrays 12a-12x requires four (4) LMLAs.

It should also be understood that although in this example each LMLA feeds two (2) rows of antenna elements, it is possible to make an embodiment in which each LMLA feeds a number of antenna rows which is greater than or less than two. For example, assuming the tile sub-array contains eight rows as shown in FIGS. 6 and 7, an LMLA configuration could be made to couple to one (1) row of antenna elements (in which case eight LMLAs per tile sub-array would be needed). Or alternatively, an LMLA configuration could be made to couple to four (4) rows of antenna elements (in which case two LMLAs per tile sub-array would be needed), or eight rows of antenna elements (in which case only one LMLA per tile sub-array would be needed). The particular number of LMLAs (i.e. the particular LMLA configuration) to use in any particular tile sub-array depends upon a variety of factors including but not limited to, the number of radiating elements in the tile sub-array, the cost of each LMLA, the particular application in which the tile sub-array will be used, the ease (or difficulty) of changing an LMLA in the sub-array (e.g. should an LMLA fail) and the cost of repairing, replacing or otherwise changing an LMLA in a tile sub-array should one fail. Those of ordinary skill in the art will understand how to select a particular LMLA configuration for a particular application.

Each LMLA may be associated with one or more T/R channels. For example, in the embodiment of FIGS. 6 and 7, each LMLA includes sixteen T/R channels arranged in a 2×8 layout coupled to a 2×8 array of antenna elements provided as part of the tile sub-array 12b. Thus, four such LMLAs are used in a complete tile sub-array. Each LMLA can be connected to a single element or a number of elements as designed and embodied in a particular application.

The details of the UMLA and the LMLA are intended to illustrate some of the circuitry included in a UMLA and LMLA as described above in conjunction with FIGS. 6 and 7 to implement the inventive circuit as taught with FIG. 1. It should thus be appreciated that the technique taught in reference to FIG. 1 can be implemented in various subarrays topologies using the fabrications techniques available. The subarrays and associated circuitry described above can utilize embedded circulators; various types of radiators; a single integrated monolithic microwave integrated circuit (MMIC); and a passive radio frequency (RF) circuit architecture. For example, the technology described in the following commonly assigned United States patents can be used in whole or in part and/or adapted to be used with at least some embodiments of the subarrays and associated circuitry described herein: U.S. Pat. No. 6,611,180, entitled "Embedded Planar Circulator"; U.S. Pat. No. 6,624,787, entitled "Slot Coupled, Polarized, Egg-Crate Radiator"; U.S. Pat. No. 6,731,189, entitled "Multilayer Stripline Radio Frequency Circuits and Interconnection Methods"; U.S. Pat. No. 7,348,932, entitled "Tile Sub-array and Related Circuits and Techniques."; and/or U.S. patent application Ser. No. 12/484,626, entitled "Panel Array" filed on Jun. 15, 2009. Each of the above patents is hereby incorporated herein by reference in their entireties.

Having described various embodiments of the invention, it should now be appreciated a feed network for an antenna subarray includes a first feed arrangement having an sum output, a second feed arrangement having an delta output and a fixed attenuator having a first port and a second port, the first port connected to the delta output of the second feed arrangement. The antenna subarray also includes a first power divider/combiner having a first and second port and a third port; the first port connected to the second port of the fixed attenuator, a variable phase shifter having a first port and a second port, the first port connected to the second port of the power divider/combiner, and a variable attenuator having a first port and a second port, the first port connected to the second port of the variable phase shifter. The antenna subarray still further includes a second power divider/combiner having a first and second port and a third port; the first port connected to the second port of the fixed attenuator; a first circulator having a first port, a second port and a third port, the first port connected to the sum output of the first feed arrangement; and a third power divider/combiner having a first and second port and a third port; the third port connected to the second port of the circulator and the second port connected to the second port of the variable attenuator.

The feed network for an antenna subarray also includes a plurality of couplers, each one of the plurality of couplers having an antenna port, a sum port, a delta port and a termination port, the sum port of each one of the plurality of couplers connected to the first feed arrangement and wherein the delta port of each one of the plurality of couplers is connected to the second feed arrangement. The feed network for an antenna subarray still further includes a second circulator having a first port, a second port and a third port, the first port connected to the third port of the first circulator and the second port connected to the first port of the third power divider/combiner.

With the above arrangement, the sum signal is split to two signals and one of the two sum signals is combined with the delta signal after a predetermined amount of attenuation in amplitude and phase. The coupling value for each one of the plurality of hybrid couplers is derived from the formula:

$$x_{m,n} \cdot g_{m,n} = \left[ \frac{(n-1/2)}{M \cdot N} + \frac{2 \cdot (m-1) \cdot N - M \cdot N}{2 \cdot M \cdot N} \right] \cdot g_{m,n}$$

where the coupling value is derived the $$\frac{(n-1/2)}{M \cdot N}$$

term and the attenuation value of the variable attenuator is derived from the $$\frac{2 \cdot (m-1) \cdot N - M \cdot N}{2 \cdot M \cdot N}$$

term as well as the phase shift value of the variable phase shifter is derived from the $$\frac{2 \cdot (m-1) \cdot N - M \cdot N}{2 \cdot M \cdot N}$$

term.

All publications and references cited herein are expressly incorporated herein by reference in their entirety.

In the figures of this application, in some instances, a plurality of elements may be shown as illustrative of a particular element, and a single element may be shown as illustrative of a plurality of a particular elements. Showing a plurality of a particular element is not intended to imply that a system or method implemented in accordance with the invention must comprise more than one of that element or step, nor is it intended by illustrating a single element that the invention is limited to embodiments having only a single one of that respective element. Those skilled in the art will recognize that the numbers of a particular element shown in a drawing can, in at least some instances, be selected to accommodate the particular user needs.

It is intended that the particular combinations of elements and features in the above-detailed embodiments be considered exemplary only; the interchanging and substitution of these teachings with other teachings in this and the incorporated-by-reference patents and applications are also expressly contemplated. As those of ordinary skill in the art will recognize, variations, modifications, and other implementations of what is described herein can occur to those of ordinary skill in the art without departing from the spirit and scope of the concepts as described and claimed herein. Thus, the foregoing description is by way of example only and is not intended to be and should not be construed in any way to be limiting.

Further, in describing the invention and in illustrating embodiments of the concepts in the figures, specific terminology, numbers, dimensions, materials, etc., are used for the sake of clarity. However the concepts are not limited to the specific terms, numbers, dimensions, materials, etc. so selected, and each specific team, number, dimension, material, etc., at least includes all technical and functional equivalents that operate in a similar manner to accomplish a similar purpose. Use of a given word, phrase, number, dimension, material, language terminology, product brand, etc. is intended to include all grammatical, literal, scientific, technical, and functional equivalents. The terminology used herein is for the purpose of description and not limitation.

Having described the preferred embodiments of the concepts sought to be protected, it will now become apparent to one of ordinary skill in the art that other embodiments incorporating the concepts may be used. Moreover, those of ordinary skill in the art will appreciate that the embodiments of the invention described herein can be modified to accommodate and/or comply with changes and improvements in the applicable technology and standards referred to herein. For example, the technology can be implemented in many other, different, forms, and in many different environments, and the technology disclosed herein can be used in combination with other technologies. Variations, modifications, and other implementations of what is described herein can occur to those of ordinary skill in the art without departing from the spirit and the scope of the concepts as described and claimed. It is felt, therefore, that the scope of protection should not be limited to or by the disclosed embodiments, but rather, should be limited only by the spirit and scope of the appended claims.

What is claimed is:

1. A feed network for an antenna subarray comprising:
   a first feed arrangement having a sum forming signal output;
   a second feed arrangement having a delta forming signal output;
   a fixed attenuator having a first port and a second port, the first port of the fixed attenuator connected to the delta forming signal output of the second feed arrangement;
   a first power divider/combiner having a first and second, port and a third port; the first port of the first power divider/combiner connected to the second port of the fixed attenuator;
   a variable phase shifter having a first port and a second port, the first port of the variable phase shifter connected to the second, port of the first power divider/combiner;
   a variable attenuator having a first port and a second port, the first port of the variable attenuator connected to the second port of the variable phase shifter;
   a second power divider/combiner having a first and second port and a third port; the first port divider/combiner: connected to the second port of the fixed attenuator;
   a first circulator having a first port, a second port and a third port, the first port of the first circulator connected to the sum forming signal output of the first feed arrangement and the second port of the first circulator connected to the third ort of the second power divider/combiner; and
   a second circulator having a first port, a second port and a third port; the first port of the second circulator connected to the second port of the second power divider/combiner and the second port of the second circulator connected to the third port of the first circulator.

2. The feed network for an antenna subarray as recited in claim 1 further comprising a plurality of couplers, each one of the plurality of couplers having an antenna port, a sum port, a delta port and a termination port, the sum port of each one of the plurality of couplers connected to the first feed arrangement.

3. The feed network for an antenna subarray a recited in claim 2 wherein the delta port of each one of the plurality of couplers is connected to the second feed arrangement.

4. The feed network for an antenna subarray as recited in claim 1 wherein a coupling value for each one of the plurality of hybrid couplers is derived from the formula:

$$x_{m,n} \cdot g_{m,n} = \left[ \frac{(n-1/2)}{M \cdot N} + \frac{2 \cdot (m-1) \cdot N - M \cdot N}{2 \cdot M \cdot N} \right] \cdot g_{m,n}$$

5. The feed network for an antenna subarray as recited in claim 4 wherein the coupling value is derived the $$\frac{(n-1/2)}{M \cdot N}$$

term.

6. The feed network for an antenna subarray as recited in claim 4 wherein the attenuation value of the variable attenuator is derived from the $$\frac{2 \cdot (m-1) \cdot N - M \cdot N}{2 \cdot M \cdot N}$$

term.

7. The feed network for an antenna subarray as recited in claim 4 wherein the phase shift value of the variable phase shifter is derived from the $$\frac{2 \cdot (m-1) \cdot N - M \cdot N}{2 \cdot M \cdot N}$$

term.

8. A feed network for an antenna subarray comprising;
   a plurality of couplers, each one of the plurality of couplers having an antenna port, a sum port, a delta port and a termination port;
   a first feed arrangement connected to each one of the sum ports of the plurality of couplers, the first feed arrangement having a sum forming signal output;
   a second feed arrangement connected to each one of the delta ports of the plurality of couplers, the second feed arrangement having a delta forming signal output;
   a fixed attenuator having a first port and a second port, the first port of the fixed attenuator connected to the delta forming signal output of the second feed arrangement;
   a first power divider/combiner having a first and second port and a third port; the first port of the first power divider/combiner connected to the second port of the fixed attenuator;
   a variable phase shifter having a first port and a second port, the first port of the variable phase shifter connected to the second port of the first power divider/combiner;
   a variable attenuator having a first port and a second port, the first port of the variable attenuator connected to the second port of the variable phase shifter;

a second power divider/combiner having a first and second port and a third port; the first port of the second power divider/combiner connected to the second port of the fixed attenuator;

a first circulator having a first port, a second port and a third port, the first port of the first circulator connected to the sum forming signal output of the first feed arrangement and the second port of the first circulator connected to the third port of the second power divider/combiner; and a second circulator having a first port, a second port and a third port; the first port of the second circulator connected to the second port of the second power divider/combiner and the second port of the second circulator connected to the third port of the first circulator.

9. An antenna subarray comprising:

a plurality of radiators;

a plurality of transmit-receive modules, each one of the transmit-receive modules coupled to a respective one of the plurality of radiators;

a plurality of RF couplers, each one connected to a respective one of said plurality of transmit-receive modules;

a first feed arrangement of uniform power dividers coupled to said plurality of RF couplers;

a second feed arrangement of uniform power dividers coupled to said plurality of RF couplers;

a first circulator having a feed port, a transmit port and a sum port, the feed port of the first circulator connected to said first feed arrangement;

a second circulator having a feed port, a transmit port and a sum port, the transmit port of the second circulator connected to the transmit port of the first circulator;

a first power divider/combiner having a first and second port and a third port;

a second power divider/combiner having a first and a second port and a third port, the third port of the second power divider/combiner connected to the sum port of the first circulator and the second port of the second power divider/combiner connected to the sum port of the second circulator;

a variable attenuator having a first and a second port, the second port of the variable attenuator connected to the first port of the second power divider/combiner;

a variable phase shifter having a first and a second port, the second port of the variable phase shifter connected to the first port of the variable attenuator and the first port of the variable phase shifter connected to the second port of the first power divider/combiner;

a fixed attenuator having a first and a second port, the first port of the fixed attenuator connected to the second feed arrangement and the second port of the fixed attenuator connected to the first port of the first power divider/combiner.

10. The antenna subarray as recited in claim 9 wherein said variable attenuator is adjusted to a value in accordance with a location of the antenna subarray within an active aperture electronically steered array.

11. The antenna subarray as recited in claim 9 wherein each one of the plurality of RF couplers comprises a four port coupler.

12. The antenna subarray as recited in claim 9 wherein said plurality of radiators comprises eight radiators and said plurality of transmit-receive modules comprise eight transmit-receive modules.

* * * * *